US009267581B2

(12) United States Patent
Fairhead et al.

(10) Patent No.: US 9,267,581 B2
(45) Date of Patent: Feb. 23, 2016

(54) CONTINUOUSLY VARIABLE TRANSMISSION

(71) Applicant: BPG RECREATIONAL INC., Oakvile (CA)

(72) Inventors: Ryan James Fairhead, Brampton (CA); Steve Micacchi, Toronto (CA)

(73) Assignee: BPG Recreational Inc., Oakville (CA)

( * ) Notice: Subject to any disclaimer, the term of this patent is extended or adjusted under 35 U.S.C. 154(b) by 0 days.

(21) Appl. No.: 14/407,430

(22) PCT Filed: Jun. 12, 2013

(86) PCT No.: PCT/CA2013/050445
§ 371 (c)(1),
(2) Date: Dec. 11, 2014

(87) PCT Pub. No.: WO2013/185228
PCT Pub. Date: Dec. 19, 2013

(65) Prior Publication Data
US 2015/0122557 A1 May 7, 2015

Related U.S. Application Data

(60) Provisional application No. 61/658,653, filed on Jun. 12, 2012.

(51) Int. Cl.
| F16H 9/16 | (2006.01) |
| F16H 9/18 | (2006.01) |
| F16H 55/56 | (2006.01) |
| B62D 11/10 | (2006.01) |
| B62M 27/02 | (2006.01) |

(52) U.S. Cl.
CPC ............... *F16H 9/16* (2013.01); *B62D 11/105* (2013.01); *B62M 27/02* (2013.01); *F16H 9/18* (2013.01); *F16H 55/563* (2013.01); *F16H 2009/163* (2013.01)

(58) Field of Classification Search
CPC ............ F16H 9/16; F16H 9/18; B62M 27/02; B62D 11/105
See application file for complete search history.

(56) References Cited

U.S. PATENT DOCUMENTS

| 5,890,992 A * | 4/1999 | Salecker .............. B60K 28/165 477/86 |
| 2005/0239592 A1 * | 10/2005 | Schoenek ................ B62J 13/00 474/144 |

(Continued)

FOREIGN PATENT DOCUMENTS

| CN | 201137682 Y | 10/2008 |
| JP | 6338746 A | 2/1988 |
| JP | 11336862 A | 12/1999 |

OTHER PUBLICATIONS

Muntean, Sorin, "International Search Report for International Application No. PCT/CA2013/050445," Canadian Intellectual Property Office, Aug. 29, 2013.

(Continued)

*Primary Examiner* — Kevin Hurley
*Assistant Examiner* — Gabriela C. Craciun
(74) *Attorney, Agent, or Firm* — Florek & Endres PLLC

(57) ABSTRACT

A driver pulley assembly for a continuously variable transmission (CVT) includes a roller weight guide, having an inner and outer periphery, adapted to be mounted on the main shaft of the CVT. A plurality of ramp windows extend radially along the roller weight guide. A pair of guide rails extend along opposite edges of each ramp window. A plurality of roller weights, mounted on the pair of guide rails, is adapted to move along the pair of guide rails in a radial direction of the roller weight guide. A ramp structure, coinciding with the ramp window, extends in the radial direction of the roller weight guide and abuts the plurality of roller weights. The roller weighs are adapted to move radially outwards along the ramp structure with increasing rotational speed of the roller weight guide. The ramp structures have ramp profiles. CVT systems and vehicles including the driver pulley assembly are also included.

27 Claims, 35 Drawing Sheets

(56) References Cited

U.S. PATENT DOCUMENTS

| | | | | |
|---|---|---|---|---|
| 2012/0179344 A1* | 7/2012 | Rioux | ............... | F16H 61/66272 701/61 |
| 2013/0139635 A1* | 6/2013 | Lai | ..................... | F16H 57/033 74/473.36 |
| 2013/0226418 A1* | 8/2013 | Yang | ..................... | B60K 17/02 701/59 |
| 2013/0316862 A1* | 11/2013 | Brandon | ................. | F16H 9/04 474/69 |
| 2014/0235389 A1* | 8/2014 | Tay | ........................ | F16H 9/16 474/137 |

OTHER PUBLICATIONS

Nickitas-Etienne, Athina, "International Preliminary Report on Patentability and Written Opinion of the International Searching Authority for International Application No. PCT/CA2013/050445," International Bureau, Dec. 16, 2014.

* cited by examiner

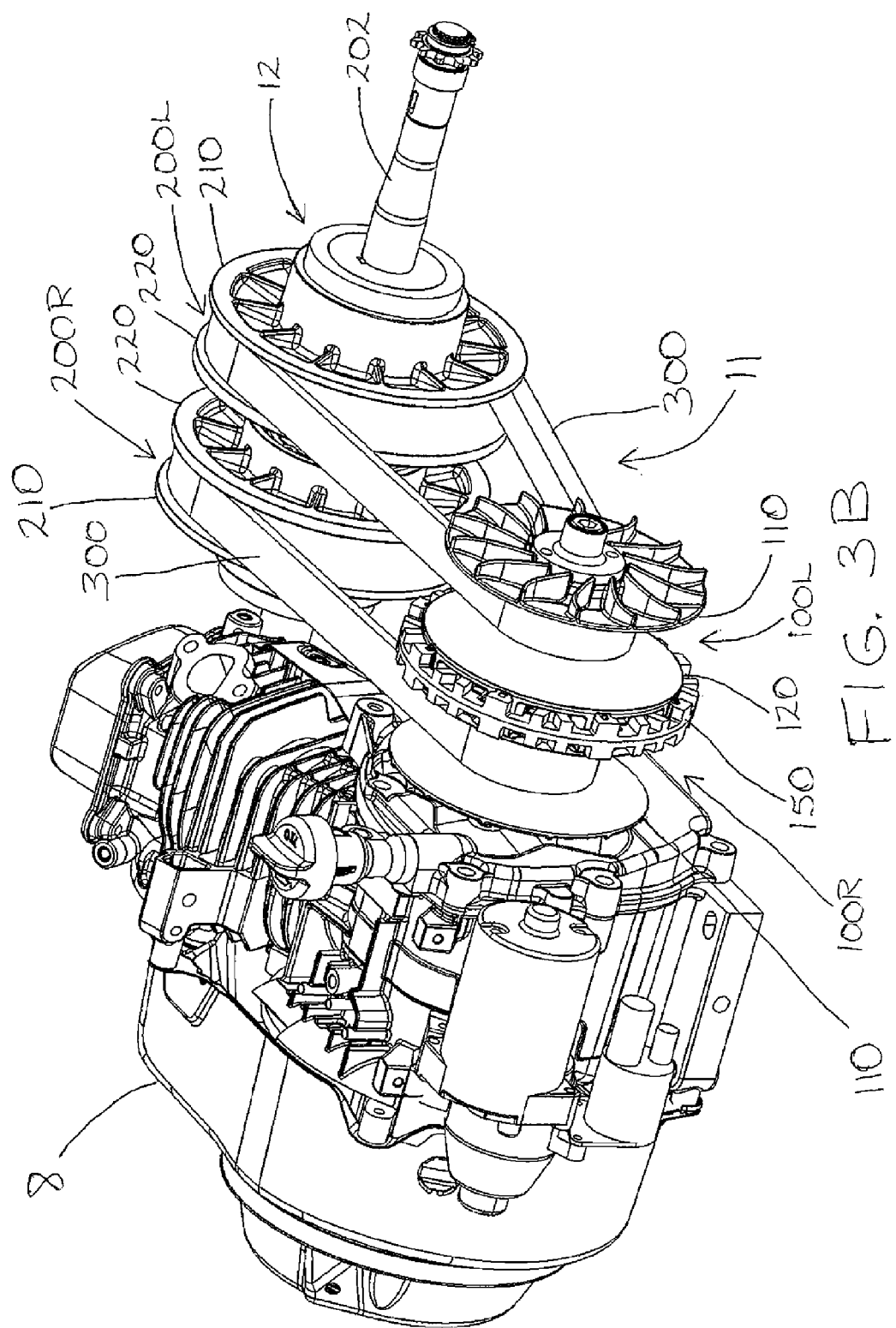

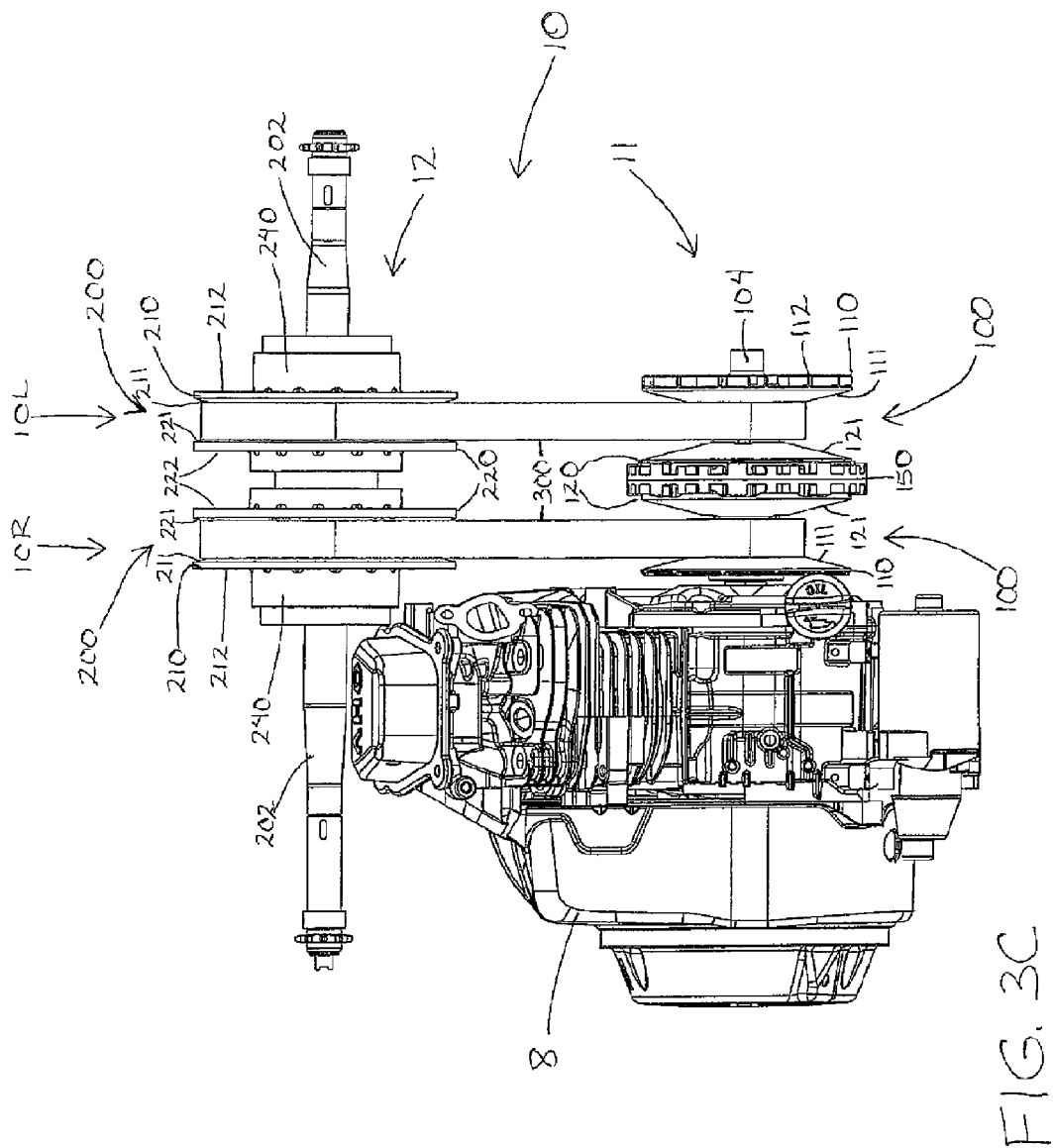

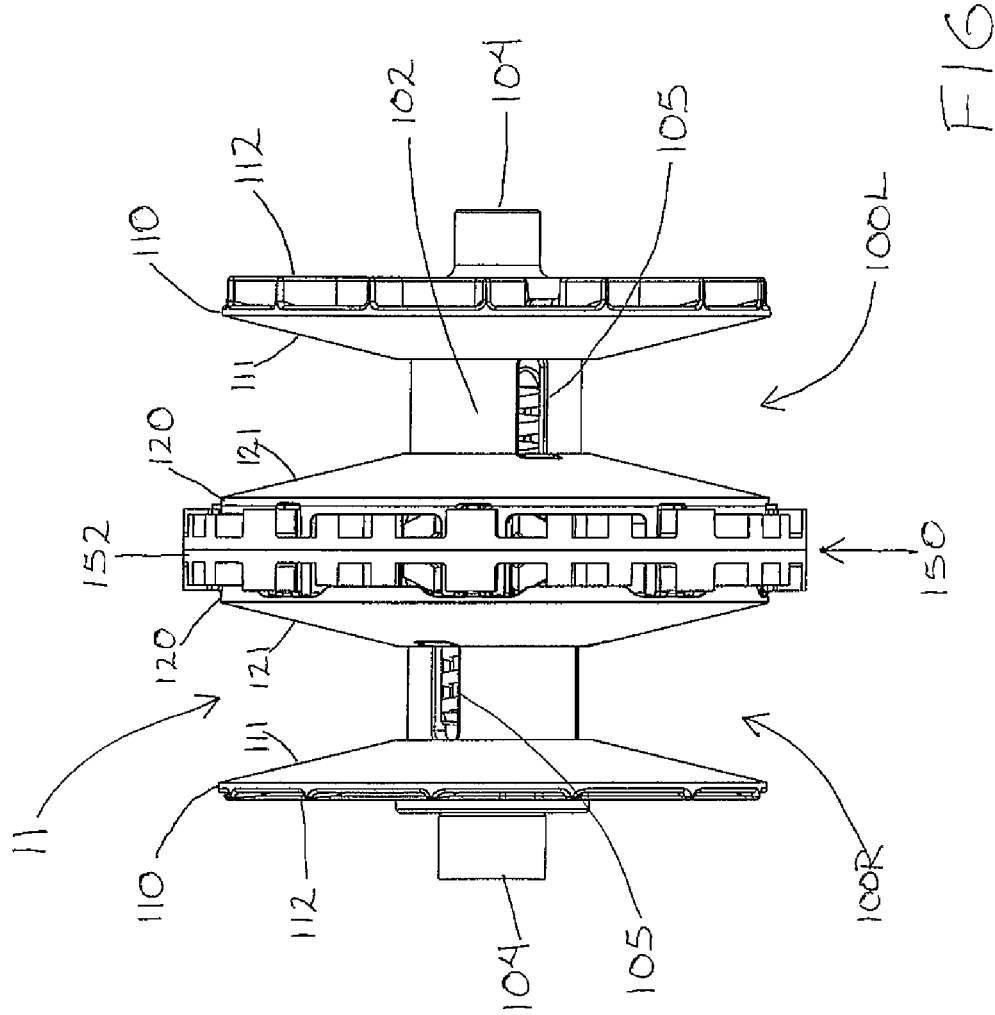

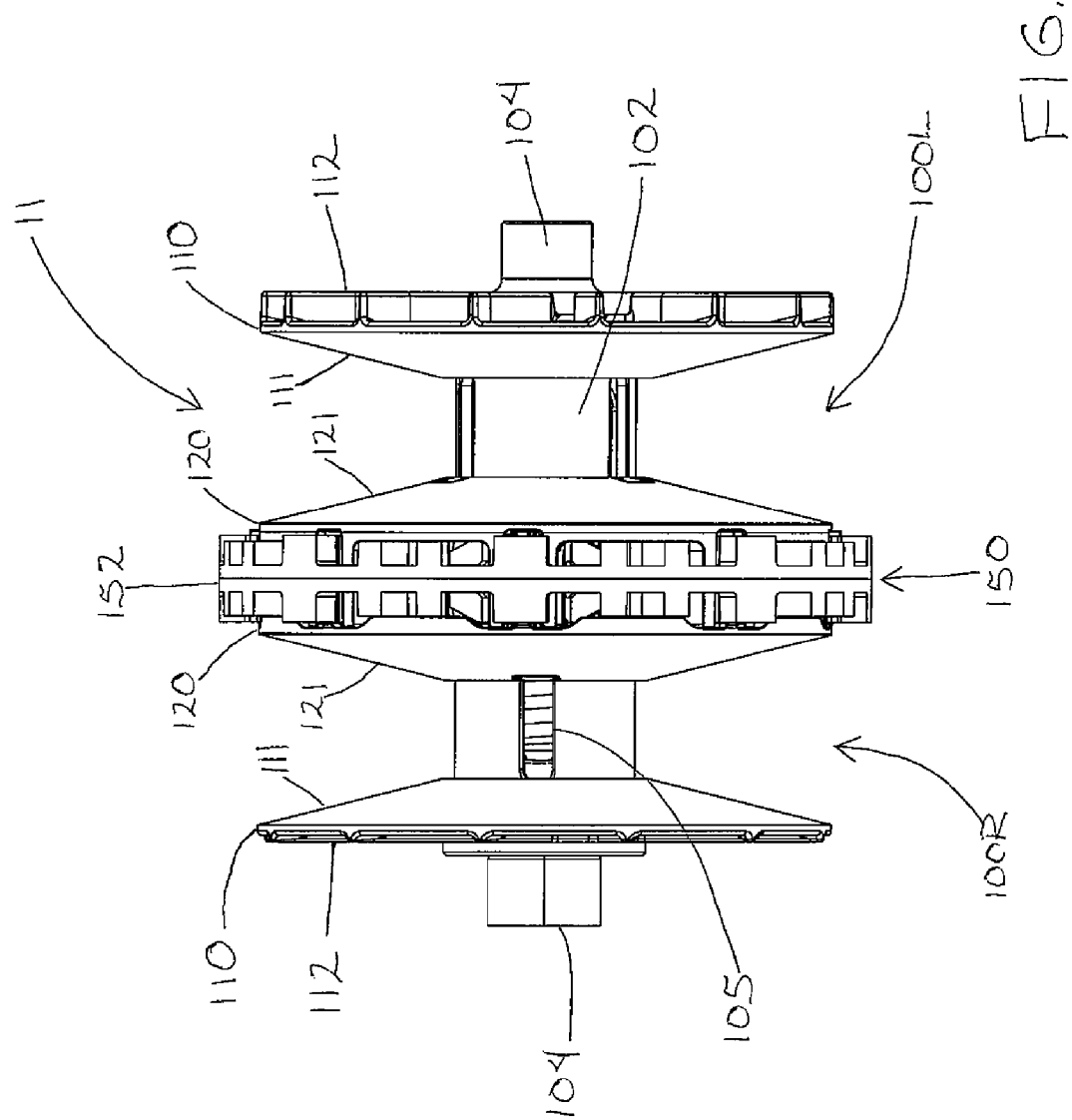

SECTION A-A
CLUTCH RAMP

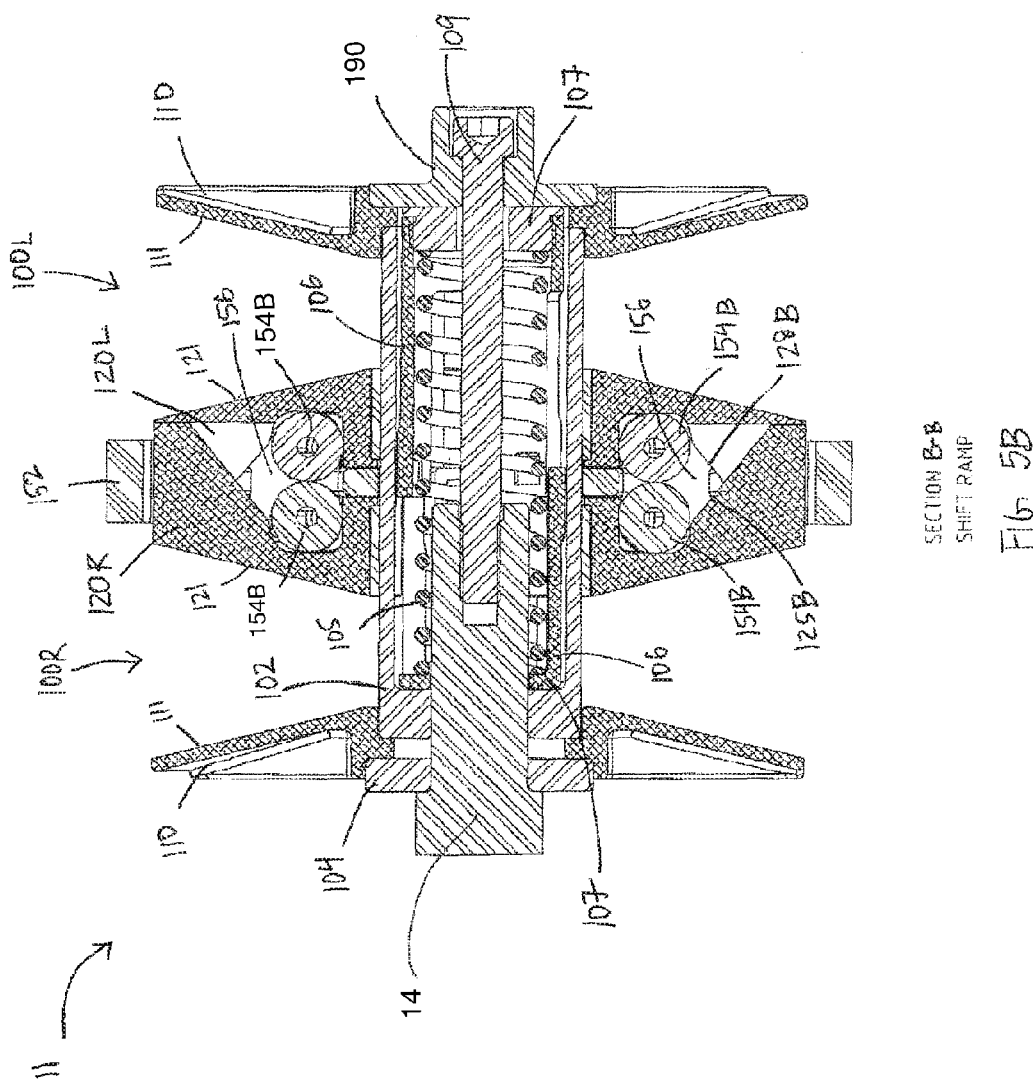

SECTION B-B
SHIFT RAMP

SECTION A-A
CLUTCH RAMP

SECTION B-B
SHIFT RAMP

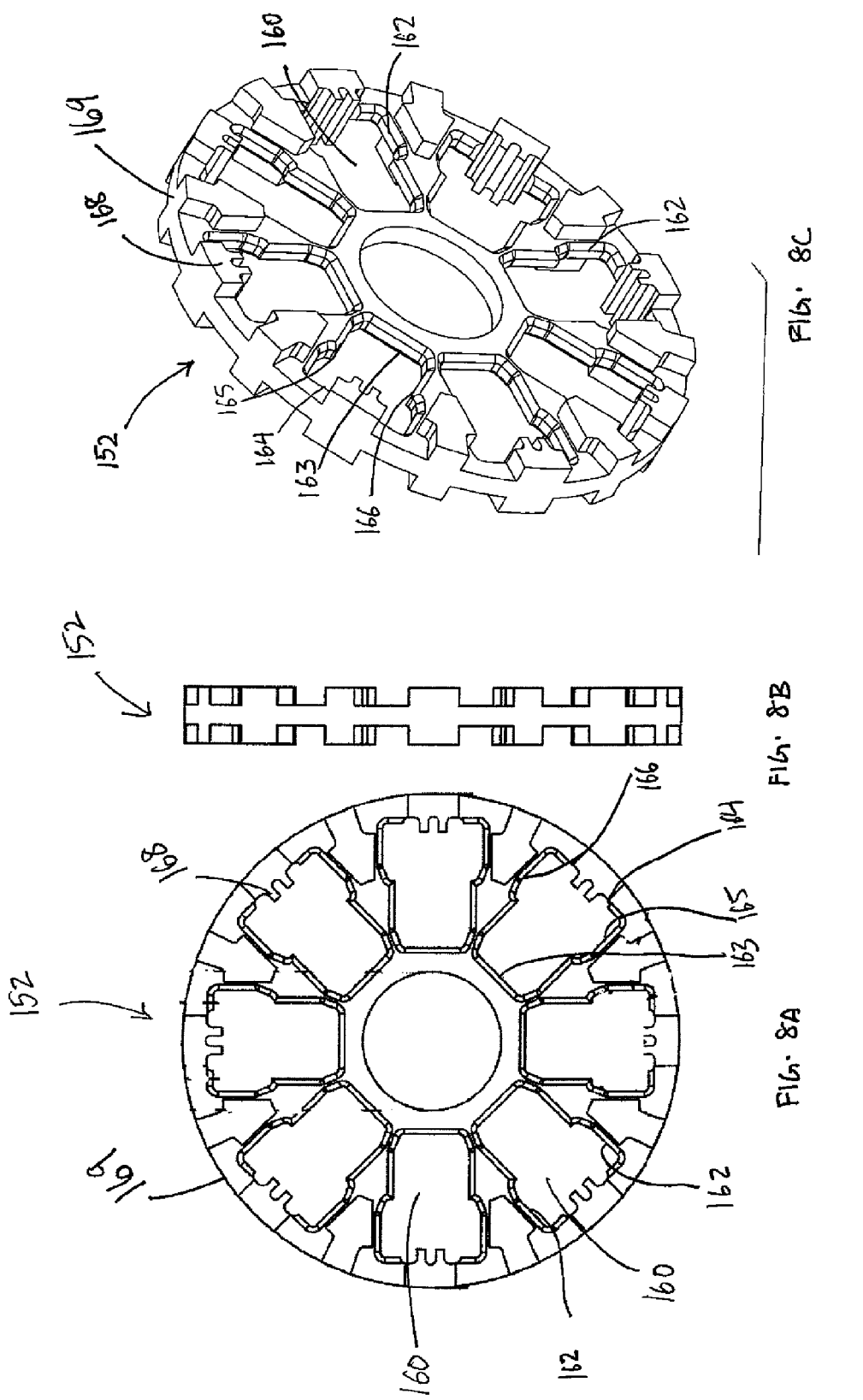

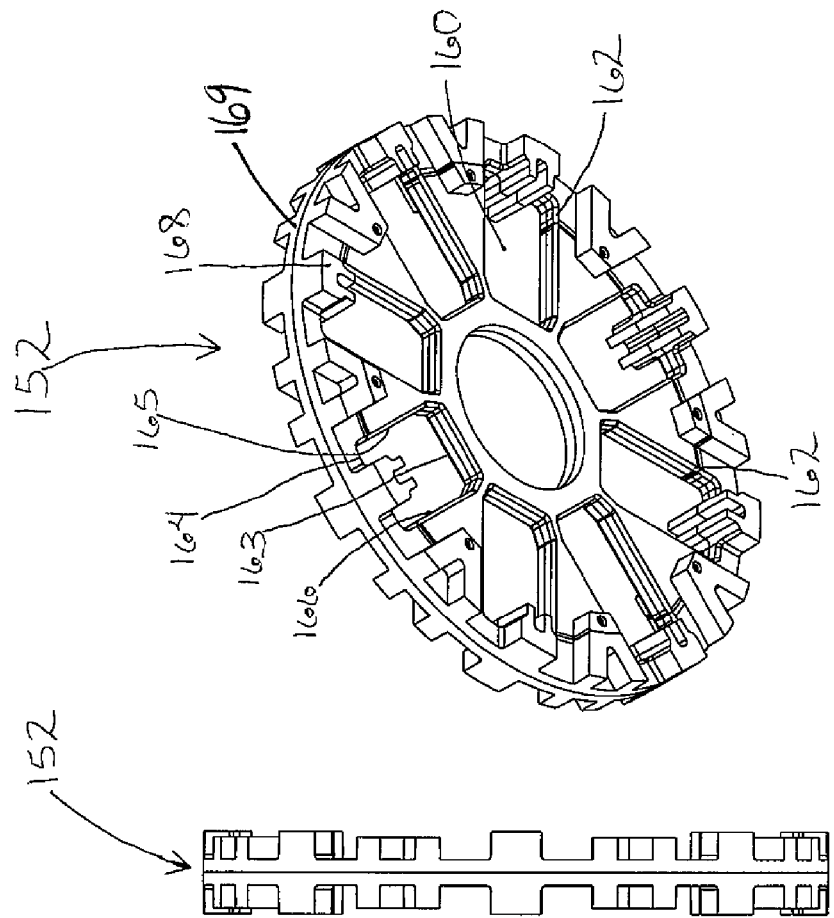
FIG. 8F
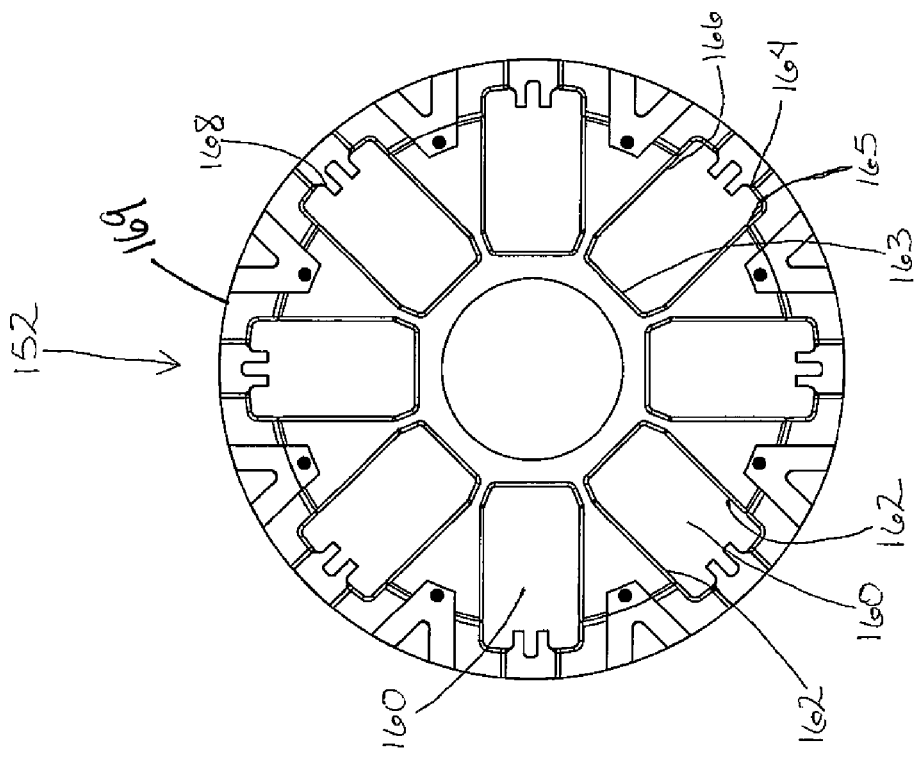
FIG. 8E
FIG. 8D

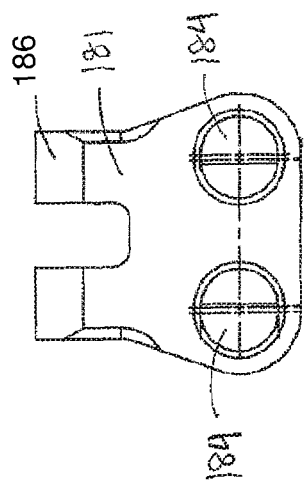
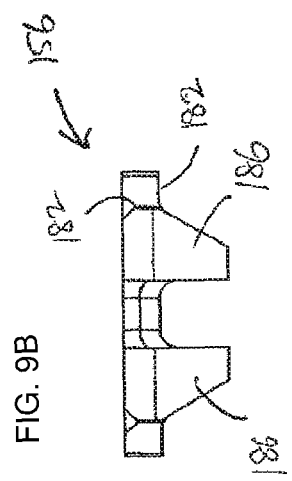
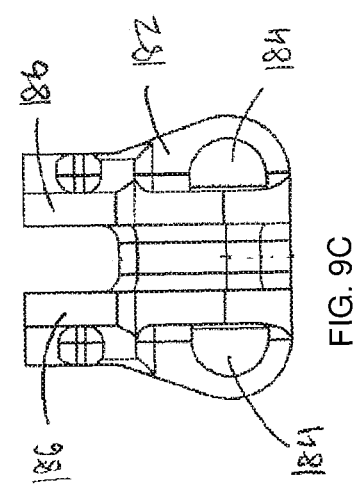
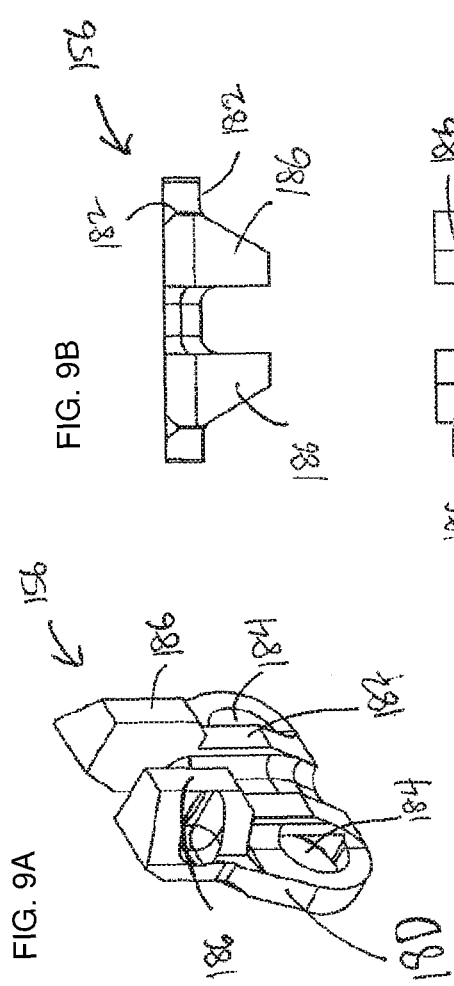

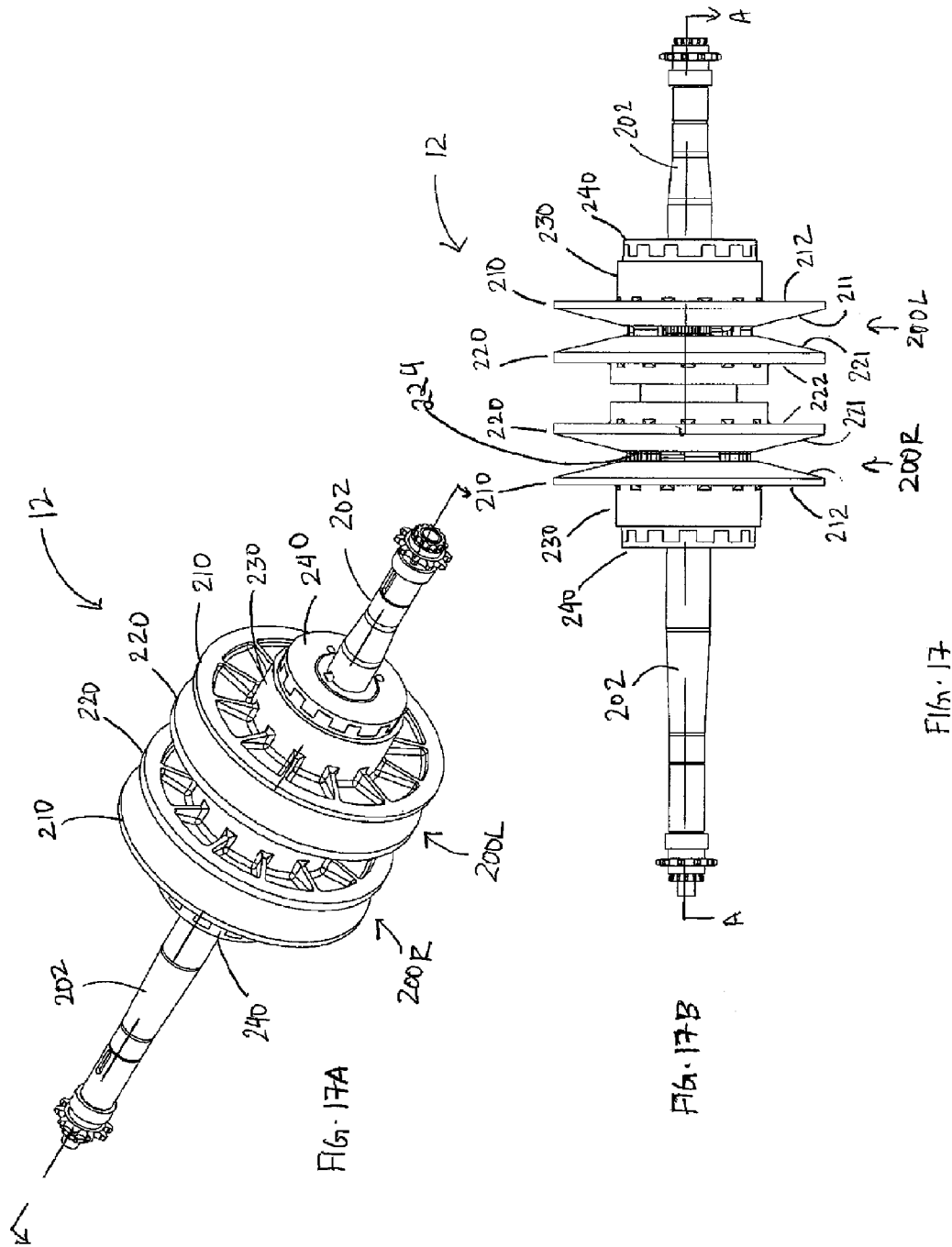

CONTINUOUSLY VARIABLE TRANSMISSION

FIELD OF THE INVENTION

The present invention relates to continuously variable transmissions.

BACKGROUND

Personal tracked vehicles allow their riders to travel over different kinds of terrains. The best known example of a personal tracked vehicle is a snowmobile. Other types include all-terrain vehicles outfitted with (usually four) tracks instead of wheels and stand-up personal tracked vehicles (such as the one shown in U.S. Pat. No. 7,575,075).

In these types of vehicles, the track is typically driven by a continuously variable transmission (CVT) connected to the track by a drive sprocket wheel. The vehicle's engine is connected to the CVT, and the CVT delivers power from the engine to the drive sprocket wheel as torque or rotational speed as required by the vehicle's speed and other driving conditions. Typically, at low vehicle speeds or going up an incline, the rotational speed of the engine is greater than that of the drive sprocket wheel and the power from the engine is used to deliver a large torque to the drive sprocket wheel. At high vehicle speeds and on level ground, the rotational speed of the engine is comparable to or greater than that of the drive sprocket wheel, the torque delivered to the drive sprocket wheel is smaller and the power from the engine is used to maintain the rotational speed of the drive sprocket wheel. The CVT provides an infinite number of gears or drive ratios (ratio of rotational speed of the engine to rotational speed of the drive sprocket wheel) to allow better use of the engine's torque for different driving conditions.

This background information is provided for the purpose of making known information believed by the applicant to be of possible relevance to the present invention. No admission is necessarily intended, nor should be construed, that any of the preceding information constitutes prior art against the present application.

SUMMARY

It is an object of the present invention to ameliorate at least some of the inconveniences present in the prior art.

In a first aspect there is provided a continuously variable transmission (CVT) system for a vehicle, including a driver pulley shaft, adapted to be operatively connected to an engine and adapted to be rotated by the engine, a driven pulley shaft parallel to the driver pulley shaft. A driver pulley comprises a first driver sheave and a second driver sheave having cones on opposing surfaces, each driver sheave being coaxially mounted on the driver pulley shaft for rotation therewith. The first driver sheave is moveable in an axial direction of the driver pulley shaft. The second driver sheave is fixed in the axial direction of the driver pulley shaft. A driven pulley comprises a first driven sheave and a second driven sheave having cones on opposing surfaces, each driven sheave being coaxially mounted on the driven pulley shaft for rotation therewith. An endless belt is supported between the opposing cones of the driver sheaves and the opposing cones at varying diameters. The endless belt is adapted to change the separation between the opposing cones of the driven pulley when the separation between the opposing cones of the driver pulley is changed. A roller weight guide is mounted on the driver pulley shaft adjacent to the first driver sheave on a side opposite to the second driver sheave. The roller weight guide is annular and has an inner periphery and an outer periphery. A plurality of guide rails are formed on the roller weight guide, each guide rail having an end near the inner periphery and another end near the outer periphery. A plurality of roller weights is mounted on the plurality of guide rails. A plurality of ramp structures extends in the radial direction on a surface of the first driver sheave adjacent to the roller weight guide, each of the plurality of ramp structures abutting one of the plurality of roller weights. Each of the plurality of roller weights is adapted to roll along at least one of the plurality of guide rails in a radial direction of the roller weight guide. The roller weights are adapted to move radially outwards with increasing rotation speed of the roller weight guide. Each of the plurality of guide rails is disposed parallel to one of the plurality of ramp structures. The first driver sheave moves towards the second driver sheave as the roller weights move radially outwards along the abutting ramp structures.

In a second aspect there is provided the driver pulley is a left driver pulley, the first driver sheave is a left inner driver sheave, the second driver sheave is a left outer driver sheave, the driven pulley shaft is a left driven pulley shaft, the driven pulley is a left driven pulley, the first driven sheave is a left inner driven sheave, the second driven sheave is a left outer driven sheave, each of the plurality of roller weights is a left roller weight, and the endless belt is the left endless belt. The CVT system further includes a right driven pulley shaft coaxially with the left driven pulley shaft, and a right driven pulley comprising a right inner driven sheave and a right outer driven sheave mounted on the right driven pulley shaft to rotate therewith. Opposing surfaces of the right inner and right outer driven sheaves comprise opposing cones. A right driver pulley comprises a right inner driver sheave and a right outer driver sheave mounted on the driver pulley shaft to rotate therewith. Opposing surfaces of the right inner and right outer driver sheaves comprise opposing cones. The right inner driver sheave is adjacent to the roller weight guide. A plurality of ramp structures on a surface of the right inner driver sheave is adjacent to the roller weight guide. Each ramp structure of the right inner driver sheave coincides with one of the plurality of ramp structures of the left inner driver sheave. A right endless belt is supported between the opposing cones of the right driver pulley and the opposing cones of the right driven pulley. The right and left inner driver sheaves are moveable in the axial direction. The right and left outer driver sheaves are fixed in the axial direction. The right and left outer driven sheaves are moveable in the axial direction. A right roller weight is mounted on the roller weight guide adjacent to each left roller weight of the plurality of roller weights to form a plurality of roller weight pairs, each right roller weight abutting one of the plurality of ramp structures of the right inner driven sheave.

In a third aspect there is provided a vehicle comprises an engine having a crankshaft, one of a pair of wheels and a pair of tracks, and a CVT system according to the above aspects. The crankshaft is connected to the driver pulley shaft. A left one of the one of the pair of wheels and the pair of tracks is connected to the left driven pulley shaft, and a right one of the one of the pair of wheels and the pair of tracks is connected to the right driven pulley shaft.

In a fourth aspect there is provided a driver pulley assembly for a continuously variable transmission (CVT) is provided. The driver pulley assembly includes a roller weight guide adapted to be mounted on a driver pulley shaft of the CVT, the roller weight guide being annular and having an inner periphery and an outer periphery. A plurality of ramp windows extending radially along the roller weight guide is also included. Each ramp window includes a pair of guide rails extending along opposite edges of the ramp window. A roller weight is mounted on the pair of guide rails, the roller weight being adapted to roll along the pair of guide rails in a radial direction of the roller weight guide. A ramp structure coincides with the ramp window, the ramp structure extending in the radial direction of the roller weight guide and abutting the roller weight. The roller weight is adapted to move radially outwards along the ramp structure with increasing rotation speed of the roller weight guide.

More particularly, in a fifth aspect there is provided a continuously variable transmission (CVT) system for a vehicle, comprising a main shaft, adapted to be operatively connected to an engine and adapted to be rotated by the engine; a drive shaft parallel to the main shaft; a driver pulley comprising a moveable sheave and a fixed sheave having cones on opposing surfaces, each of said moveable sheave and said fixed sheave being coaxially mounted on the main shaft for rotation therewith; the moveable sheave being moveable in an axial direction of the main shaft; the fixed sheave being fixed in the axial direction of the main shaft; a driven pulley comprising a steering sheave and a torque-sensing sheave having cones on opposing surfaces, the steering sheave and torque-sensing sheave being coaxially mounted on the drive shaft for rotation therewith; an endless belt, supported between the opposing cones of the moveable sheave and the fixed sheave and the opposing cones of the steering sheave and the torque-sensing sheave, the endless belt being adapted to change the separation between the opposing cones of the steering sheave and the torque-sensing sheave when the separation between the opposing cones of the moveable sheave and the fixed sheave is changed; a roller weight guide mounted on the main shaft adjacent to the moveable sheave on a side opposite to the fixed sheave, the roller weight guide having an inner periphery and an outer periphery; a plurality of guide rails on the roller weight guide, each guide rail having an end near the inner periphery and another end near the outer periphery; a plurality of roller weights mounted on the plurality of guide rails; a plurality of ramp structures extending in the radial direction on a surface of the moveable sheave adjacent to the roller weight guide, each of the plurality of ramp structures abutting one of the plurality of roller weights; each roller weight of the plurality of roller weights being adapted to move along at least one of the plurality of guide rails in a radial direction of the roller weight guide; each roller weight being adapted to move radially outwards with increasing rotational speed of the roller weight guide; each guide rail of the plurality of guide rails being disposed substantially parallel to one of the plurality of ramp structures; the moveable sheave moving towards the fixed sheave as the roller weights move radially outwards along abutting ramp structures.

In sixth aspect the driver pulley is a left driver pulley; the moveable sheave is a left moveable sheave; the fixed sheave is a left fixed sheave; the drive shaft is a left drive shaft; the driven pulley is a left driven pulley; the steering sheave is a left steering sheave; the torque-sensing sheave is a left torque-sensing sheave; each of the plurality of roller weights is a left roller weight; and the endless belt is a left endless belt; and the CVT system further comprises a right driven pulley comprising a right steering sheave and a right torque-sensing sheave coaxially mounted on the right drive shaft to rotate therewith, opposing surfaces of the right steering sheave and the right torque-sensing sheave comprising opposing cones; a right driver pulley comprising a right moveable sheave and a right fixed sheave coaxially mounted on the main shaft to rotate therewith, opposing surfaces of the right moveable sheave and the right fixed sheave comprising opposing cones, the right moveable sheave being adjacent to the roller weight guide; a plurality of ramp structures extending in the radial direction on a surface of the right moveable sheave adjacent to the roller weight guide; and a right endless belt, supported between the opposing cones of the right moveable sheave and the right fixed sheave and the opposing cones of the right steering sheave and the right torque-sensing sheave, the right endless belt being adapted to change the separation between the opposing cones of the right steering sheave and the right torque-sensing sheave when the separation between the opposing cones of the right moveable sheave and the right fixed sheave is changed; wherein the right and left moveable sheaves are moveable in the axial direction; the right and left fixed sheaves are fixed in the axial direction; the right and left torque-sensing sheaves are moveable in the axial direction; a plurality of right roller weights mounted on the plurality of guide rails each of the plurality of ramp structures abutting one of the plurality of roller weights each of the left and right roller weights being adapted to move radially outwards with increasing rotational speed of the roller weight guide; and the right moveable sheave moving towards the right fixed sheave as the right roller weights move radially outwards along abutting ramp structures.

In a seventh aspect there is provided a vehicle comprising a motor having an output shaft; one of at least two wheels and a pair of tracks; and a CVT system according to the fifth or sixth aspect wherein the output shaft is connected to the main shaft; a left one of one of the at least two wheels and the pair of tracks is connected to the left drive shaft; and a right one of one of the at least two wheels and the pair of tracks is connected to the right drive shaft.

In an eight aspect there is provided a driver pulley assembly for a continuously variable transmission (CVT), comprising: a roller weight guide adapted to be mounted on a main shaft of the CVT, the roller weight guide having an inner periphery and an outer periphery; a plurality of ramp windows extending radially along the roller weight guide; each ramp window including a pair of guide rails extending along opposite edges of the ramp window; a roller weight mounted on the pair of guide rails, the roller weight being adapted to move along the pair of guide rails in a radial direction of the roller weight guide; and a ramp structure coinciding with the ramp window, the ramp structure extending in the radial direction of the roller weight guide and abutting the roller weight; the roller weight being adapted to move radially outwards along the ramp structure with increasing rotational speed of the roller weight guide.

For purposes of the present application, terms related to spatial orientation when referring to a continuously varying transmission and components in relation to the continuously varying transmission, such as "forwardly", "rearwardly", "left", "right", "above" and "below", are as they would be understood by a driver of a vehicle to which the transmission is connected, with the continuously varying transmission connected to the underside of the of the vehicle, in a straight ahead orientation (i.e. not steered left or right), and in an upright position (i.e. not tilted). The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3B is a perspective view taken from the top, left side of the continuously variable transmission (CVT) of FIG. 3A connected to an engine;

FIG. 3C is a top plan view of the CVT of FIG. 3B connected to an engine;

FIGS. 4A, 4B and 4C are, respectively, a perspective view taken from the top, left side; a front elevation view; and a top plan view of the driver pulley assembly of the CVT of FIG. 3E;

FIGS. 5A and 5B are cross-sectional views, taken respectively along the line A-A and B-B, of the driver pulley assembly of FIG. 3E showing the driver pulley assembly in a disengaged configuration, with the belt removed for clarity;

FIG. 8 shows various views of the roller weight guide of the CVT of FIG. 3E; FIG. 8A is a left side elevation view, FIG. 8B is a front plan view; FIG. 8C is a perspective view taken from a front, left side of the roller weight guide; Figure shows various views of a two piece roller weight guide of the CVT of FIG. 3E; FIG. 8D is a left side elevation view, FIG. 8E is a front plan view; and FIG. 8F is a perspective view taken from a front, left side of the roller weight guide;

FIG. 9 shows various views of a roller weight button or slider of the CVT of FIG. 3E, FIG. 9A is a perspective view taken from the front, left side; FIG. 9B is a top plan view; FIG. 9C is a front elevation view; and FIG. 9D is a rear elevation view;

FIG. 10A is a perspective view taken from the front, left side; FIG. 10B is a top plan view; and FIG. 10C is a cross-section taken along the line B-B of FIG. 10B;

FIG. 11A is a perspective view taken from the front, left side; FIG. 11B is a left side elevation view; FIG. 11C is a rear elevation view; FIG. 11D is a right side elevation view; FIG. 11E is a cross-section taken along the line A-A of FIG. 11B; and FIG. 11F is a cross-section taken along the line B-B of FIG. 11B;

FIG. 12A is a perspective view taken from the rear, right side; FIG. 12B is a right side elevation view; FIG. 12C is a front elevation view; FIG. 12D is a left side elevation view; FIG. 12E is a cross-section taken along the line A-A of FIG. 13B; and FIG. 12F is a cross-section taken along the line B-B of FIG. 12B;

FIGS. 17A and 17B are respectively, a perspective view taken from the front, left side; and a front elevation view of the driven pulley assembly of the CVT of FIG. 3A;

DETAILED DESCRIPTION

Although a personal stand-up dual tracked vehicle is being described herein, it is contemplated that other embodiments could include other kinds of personal tracked vehicles, for example, a straddle-seat, dual-tracked vehicle. Other embodiments relate to wheeled vehicles.

Figure 1:
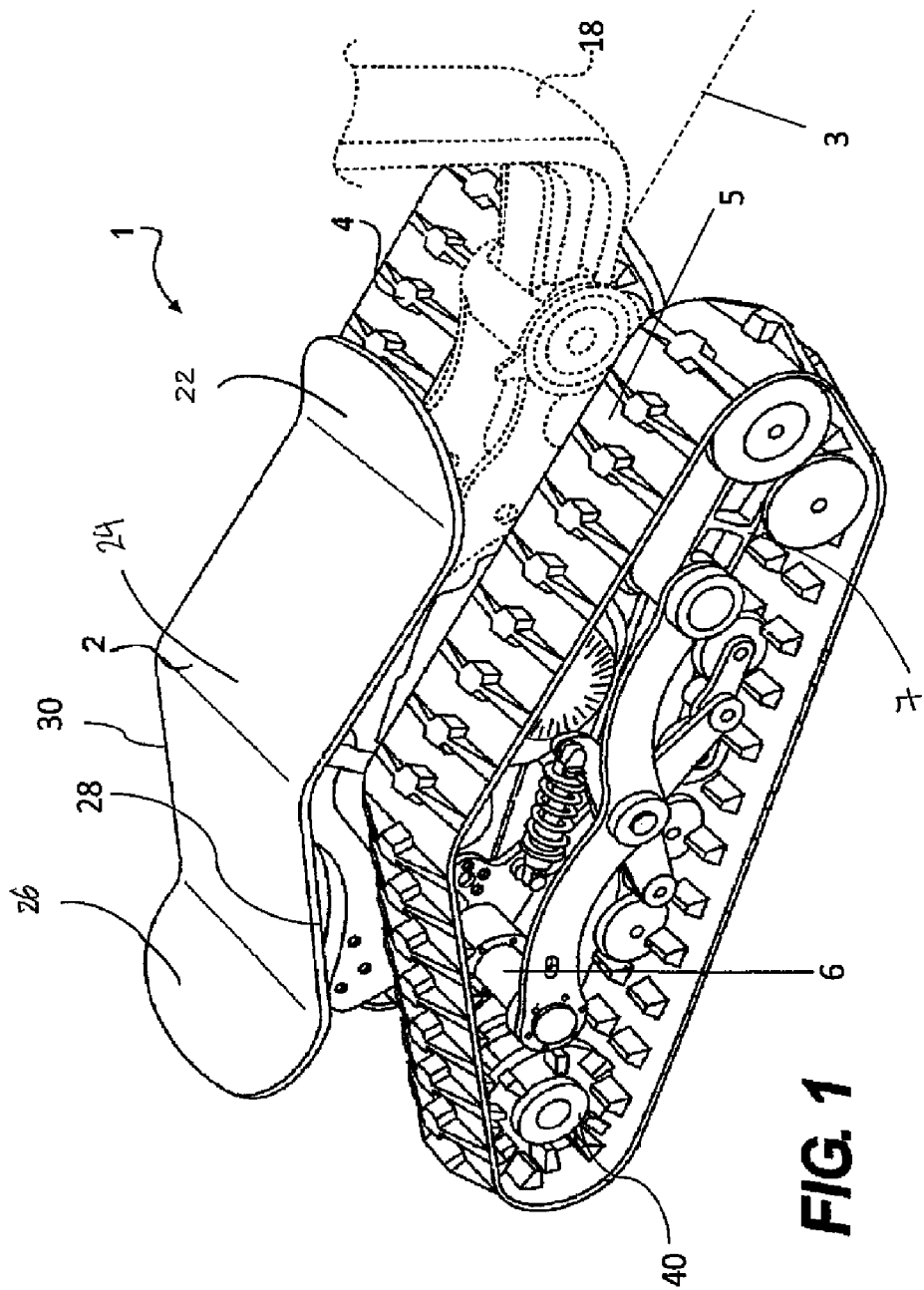
FIG. 1 is a perspective view taken from a front, right side of a personal dual-tracked vehicle.
Figure 2:
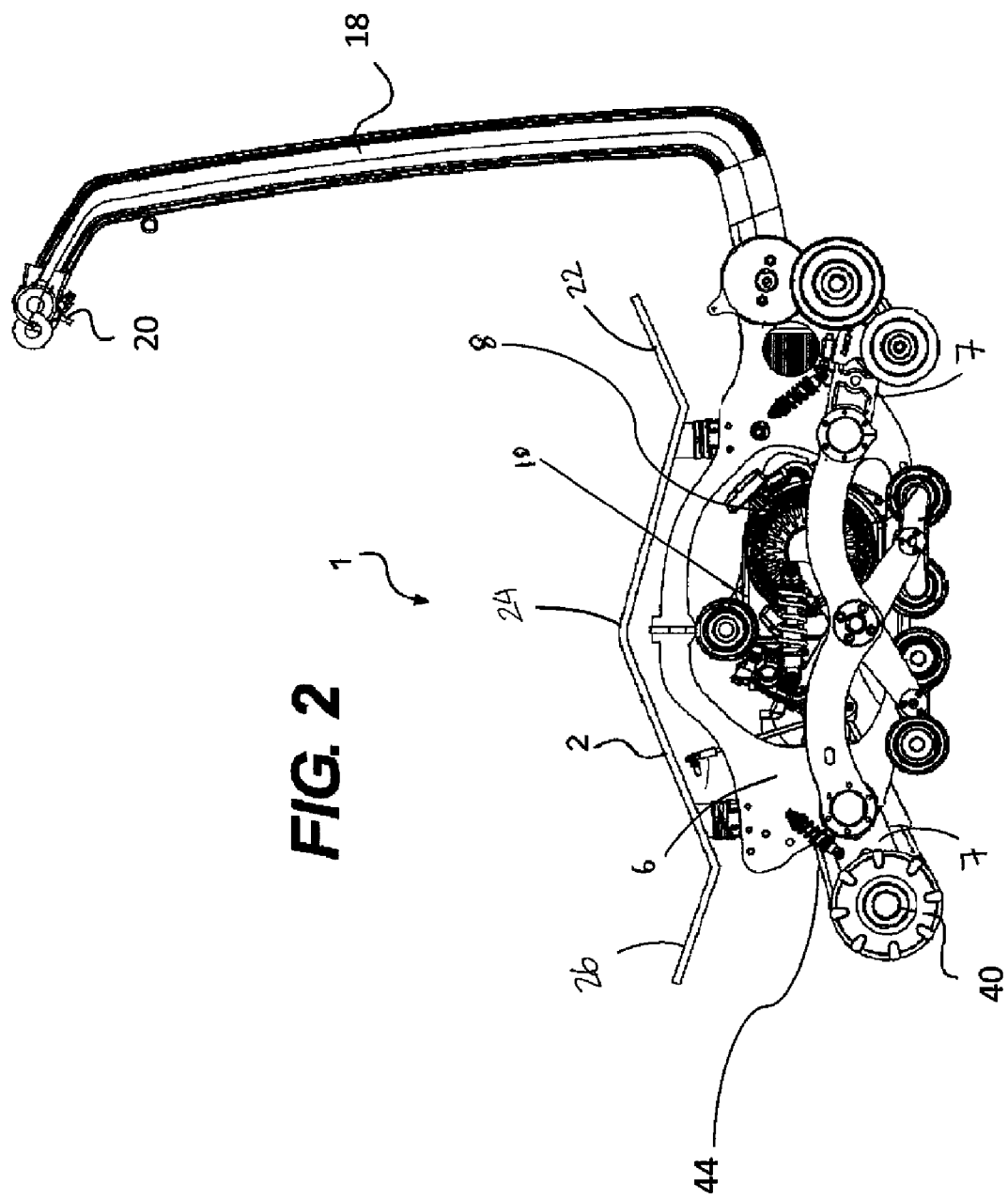
FIG. 2 is a right side elevation view of a portion of the personal dual-tracked vehicle of FIG. 1.

With reference to FIGS. 1 and 2, a personal stand up dual-tracked vehicle 1 has a platform 2 mounted over a pair of left and right tracks, 4 and 5. The left and right tracks 4, 5 are laterally spaced and define a longitudinal axis 3 of the vehicle 1. The vehicle 1 has a frame 6 and a suspension assembly 7 connected to the frame 6 supporting the endless tracks 4, 5. An engine 8, located between the tracks 4 and 5 below the platform 2, is also connected to the frame 6.

The vehicle 1 is designed to be driven with a rider standing on the platform 2. The tracks 4, 5 extend laterally further than the platform 2, and the engine 8 and other components of the vehicle 1 are disposed between the tracks 4, 5 below the platform 2 so that the center of gravity of the vehicle 1 is generally low, for stability of the vehicle 1 even with a rider standing on the platform 2.

A handlebar 18 (shown in FIG. 2) with a throttle control 20 controls the engine 8. The handlebar 18 extends upwards so that the throttle control 20 is at a level of rider's hands with the rider in a standing position. Alternatively, the vehicle 1 can also be provided with a cable connected to the throttle control 20 instead of the handlebar 18. It is also contemplated that the engine controls could be connected wirelessly to the engine and remotely controlled by the rider of the vehicle 1.

Figure 5A:
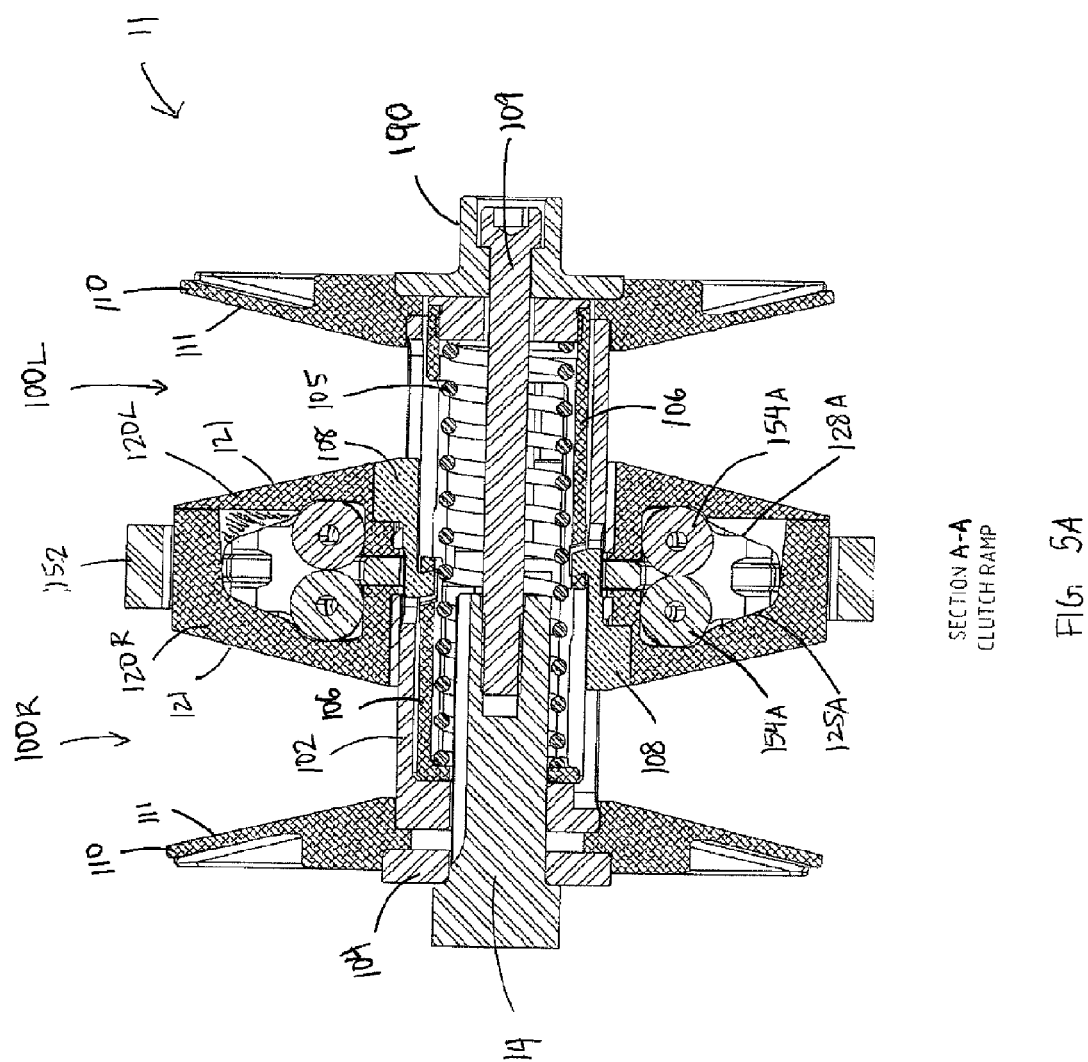

The engine 8 propels the vehicle 1 by driving the endless tracks 4, 5. The engine 8 is operatively connected to the endless tracks 4, 5 by a dual drive continuously variable transmission (ddCVT) 10, which will be discussed in further detail below. The engine 8 is coupled to the ddCVT 10 by a crankshaft 14 (FIG. 5A). The ddCVT 10 is connected to each track 4, 5 by a chain 44 and drive sprocket wheel 40 at the rear of the vehicle 1. Although the drive wheel depicted in FIG. 1 is a drive sprocket wheel any type of drive wheel can be connected to the ddCVT for driving the ddCVT, for example, a drive wheel connected to a pulley, belt or gear.

The vehicle 1 is steered by selectively driving one of the tracks 4, 5 faster than the other of the tracks 4, 5. Steering of the vehicle 1 is controlled by pivoting the platform 2. A steering system 16, comprising a steering rod 203 (FIGS. 20A 20B and 22) couples the platform 2 to the ddCVT 10 for steering the vehicle 1. When the platform 2 pivots about the longitudinal axis 3 to the right side, the left track 4 is driven faster than the right track 5 thereby steering vehicle 1 towards the right side. Similarly, when the platform 2 pivots about the longitudinal axis 3 towards the left, the right track 5 is driven faster than the left track 4 thereby steering vehicle 1 towards the left. In some embodiments, the steering system 16 comprises a differential connected between the platform 2 and the ddCVT 10 for steering the vehicle 1. In some embodiments, the steering system 16 can comprise a different control mechanism, or a control assist mechanism located elsewhere on the vehicle 1. Hydraulics can be used as an alternate control or control assist mechanism for the steering system 16.

The platform 2 has a forward portion 22, a central portion 24, and a rearward portion 26. The platform 2 has a right side 28 and a left side 30. The forward and rearward portions, 22 and 26, which are upwardly inclined with respect to the central portion 24, act as front and rear foot rests, respectively. The platform 2 is pivotably connected to the frame 6 and selectively tilted by the rider by selectively applying a greater fraction of weight to the left or right sides, 28 or 30, of the platform 2. It is also contemplated that the steering assembly 16 could be configured such that a rightward tilt of the platform 2 corresponds to a leftward steering position and vice versa.

When riding the vehicle 1, the rider places his/her feet on the forward and rearward portions 22, 26 such that the central portion 24 is disposed between his/her legs. The rider usually twists his/her torso with respect to his/her legs so as to be able to look forward, similar to a skateboard rider. The positioning of the feet on the forward and rearward portions, 22 and 26, permits the rider to control the tilting of the platform 2 while minimizing chances of the rider becoming unbalanced. U.S. Pat. No. 7,575,075, issued Aug. 18, 2009, which is incorporated herein by reference, describes a personal tracked vehicle having a platform which is pivoted to steer the vehicle.

With reference to FIGS. 3A, 3B, 3C and 3D, the ddCVT 10, includes a driver pulley assembly 11, disposed towards the front of the vehicle 1, and a driven pulley assembly 12, disposed towards the rear of the vehicle 1. The driver pulley assembly 11 of the ddCVT 10 is connected to the crankshaft 14 (FIG. 5A) of the engine 8 while the driven pulley assembly 12 is connected to the drive sprocket wheels 40 (FIG. 21) at the rear of the vehicle 1. It is however also contemplated that the drive sprocket wheels could be disposed at the front of the vehicle 1, and the driven pulley assembly 12 could be disposed towards the front of the vehicle 1 with the driver pulley assembly disposed towards the rear of the vehicle 1. In other embodiments, the engine 8 can be any power source with an output shaft, for example and electric motor or an hydraulic motor.

The ddCVT 10 has a pair of parallel CVTs, including a left CVT 10L and a right CVT 10R. The left and right CVTs, 10L and 10R, are generally mirror images of each other. Corresponding features of the left and right CVTs, 10L and 10R, are denoted by a common reference number, in the discussion below. When referring to features that are similar on the left and right sides, the components will be referred to only by the common reference number and without using "L" and "R" to distinguish between the left and right side components (for example, "CVTs 10" instead of "left and right CVTs, 10L and 10R"). When discussing features that are different on the left and right sides, the corresponding left and right sides features may be distinguished, for clarity, using "L" and "R" after the reference number, or by using different reference numbers for them.

Each CVT 10L, 10R comprises a driver pulley 100, a driven pulley 200, and the endless belt 300 coupling the driver and the driven pulleys, 100 and 200. The driver pulleys 100L, 100R form part of the driver pulley assembly 11. The driven pulleys 200L, 200R form part of the driven pulley assembly 12. The driver and driven pulleys, 100 and 200, are variable diameter pulleys. The belt 300 defines the effective diameter of the driver and the driven pulleys, 100 and 200. The effective diameter of the pulleys 100, 200 is varied by changing the radial position at which the belt 300 is held in the pulleys 100, 200.

With reference to FIGS. 4A to 7B the left and right driver pulleys 100 each comprise an inner or moveable sheave 120 and an outer or fixed sheave 110. The fixed sheaves 110, 110 are fixed in the axial direction while the moveable sheaves 120 are moveable in the axial direction. The belts 300, 300, are disposed between the fixed sheaves 110, 110 and moveable sheaves 120, 120. Therefore, the radial position of the belt 300 in the driver pulleys 100, 100 can be controlled by controlling the axial position of the moveable sheaves 120, 120.

With reference to FIGS. 3C, 20A, 20B, and 22 the left and right driven pulleys 200, 200 each comprise an outer or torque-sensing sheave 210 and an inner or steering sheave 220. Both the torque sensing sheaves 210, 210 and the steering sheaves 220, 220 can move axially relative to the transmission housing. However, the axial position of the steering sheaves 220, 220 are actively controlled by the vehicle rider, while the axial position of the torque sensing sheaves 210, 210 are passively controlled by several opposing variable axial forces as discussed in detail below. The left and right driven pulleys 200, 200 are respectively mounted on left and right drive shafts 202, 202 and coupled by a steering rod 203 (FIGS. 3C, 20A, 20B and 22) to form the driven pulley assembly 12. The left and right driven pulleys 200 each comprise an outer or torque-sensing sheave 210 and an inner or steering sheave 220 (FIG. 3B). The steering rod 203 (FIGS. 20A, 20B and 22) is coupled to the inner steering sheaves 220. Each of the left and right drive shafts, 202 and 202, is coupled to the respective endless track, 4 and 5, via a chain 44 and a drive sprocket wheel 40 (shown in FIG. 21).

Opposing surfaces of the outer fixed sheaves 110 and inner moveable sheaves 120, and the torque-sensing sheave 210 and the steering sheave 220, of each pulley 100, 200 have conical surfaces, 111 and 121, 211 and 221. The belt 300 is held between the opposing conical surfaces, 111 and 121, 211 and 221. The radial position of the belt 300 varies with the separation of the opposing conical surfaces, 111 and 121, 211 and 221, thereby changing the effective diameter of the pulleys, 100 and 200. Increasing the separation between the opposing conical surfaces, 111 and 121, 211 and 221, results in the belt 300 moving inwards towards the respective main or drive shafts, 102 or 202, thereby decreasing the effective pulley diameter. Similarly, the effective diameter of the pulleys 100, 200 can be increased by decreasing the separation between opposing conical surfaces, 111 and 121, 211 and 221.

Figure 3A:
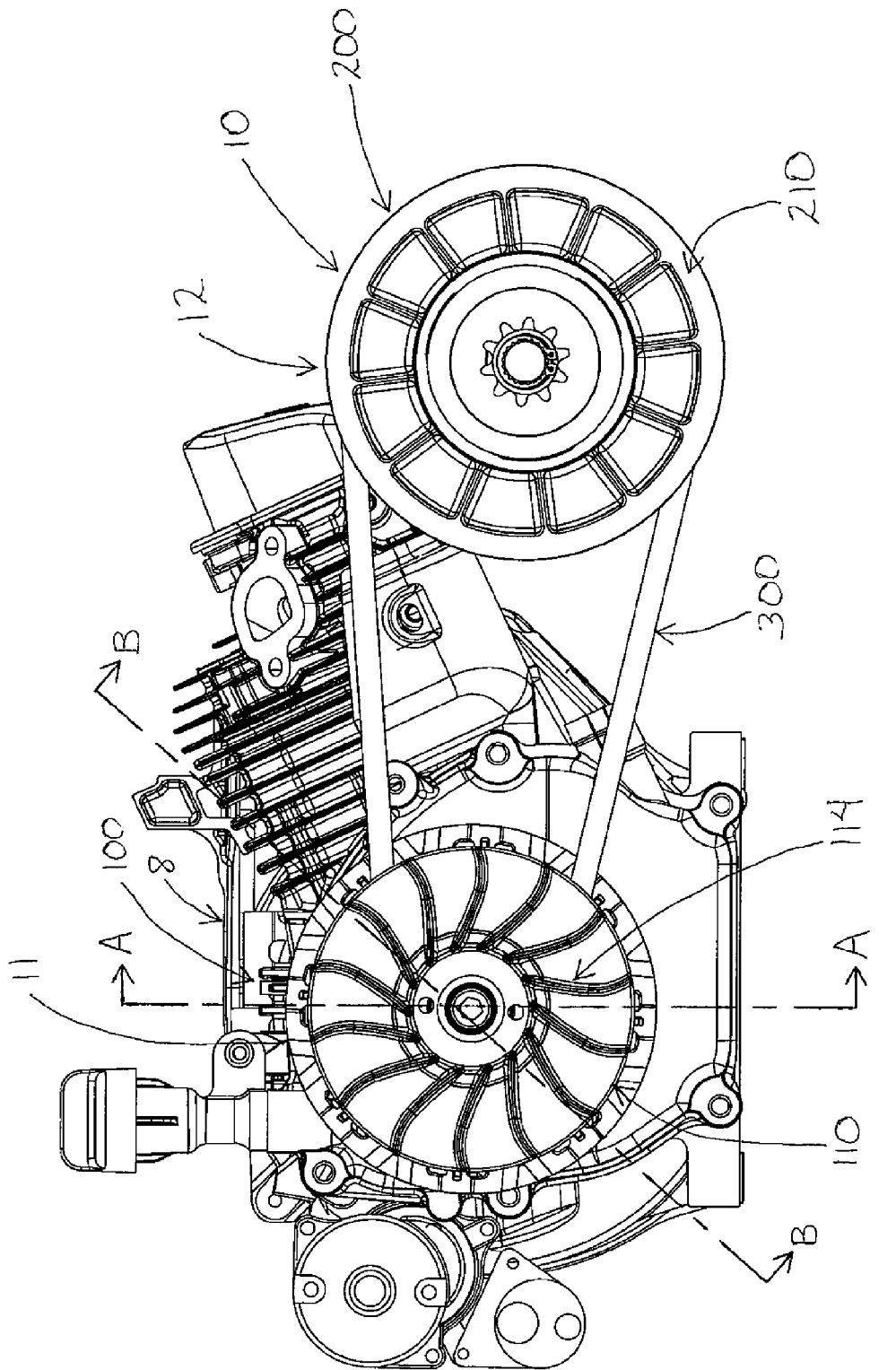
FIG. 3A is a left side elevation view of a continuously variable transmission (CVT) in accordance with one embodiment of the present application connected to an engine.
Figure 3D:
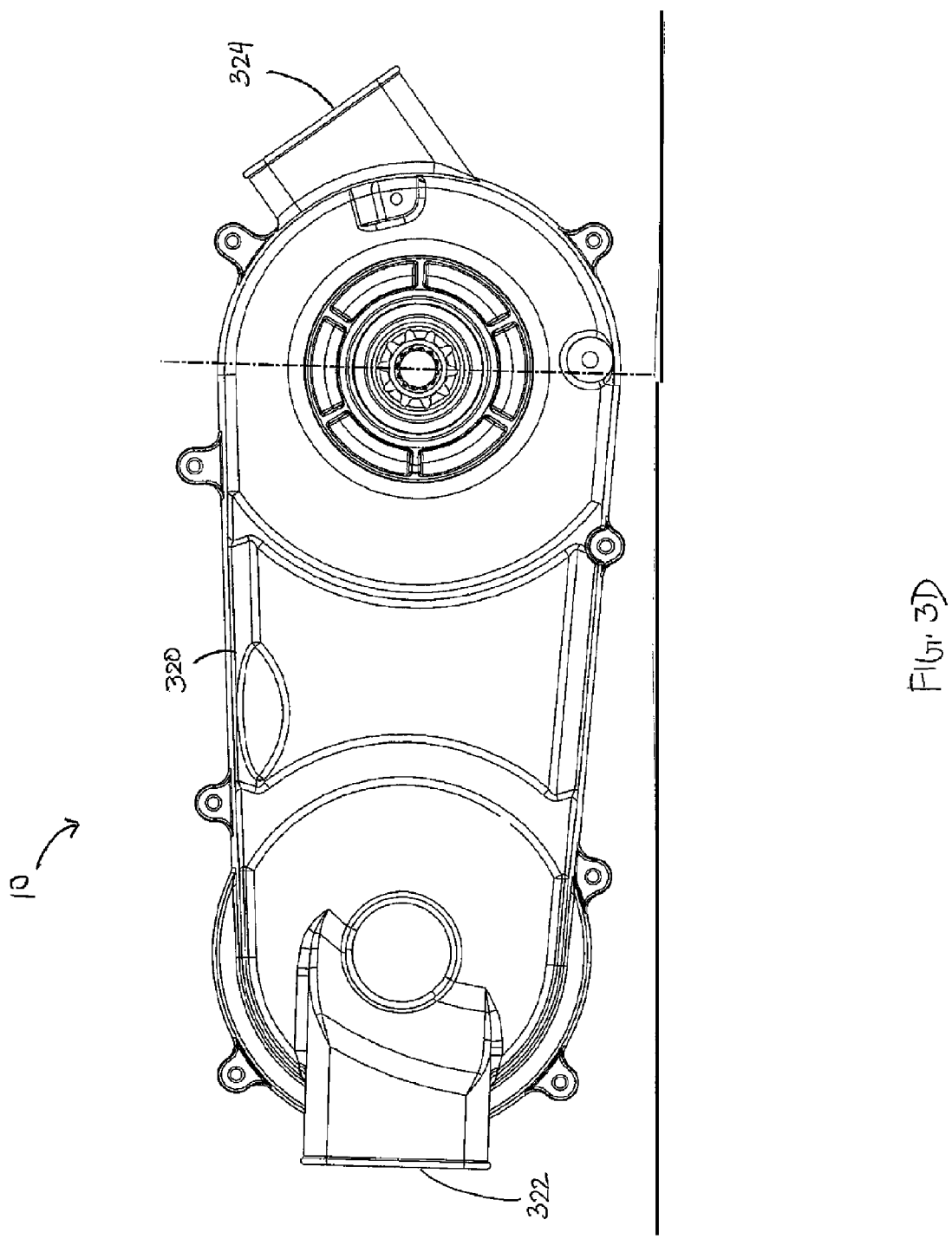
FIG. 3D is a left side elevation view illustrating the CVT of FIGS. 3A-C housed in a closed housing chamber.
Figure 3E:
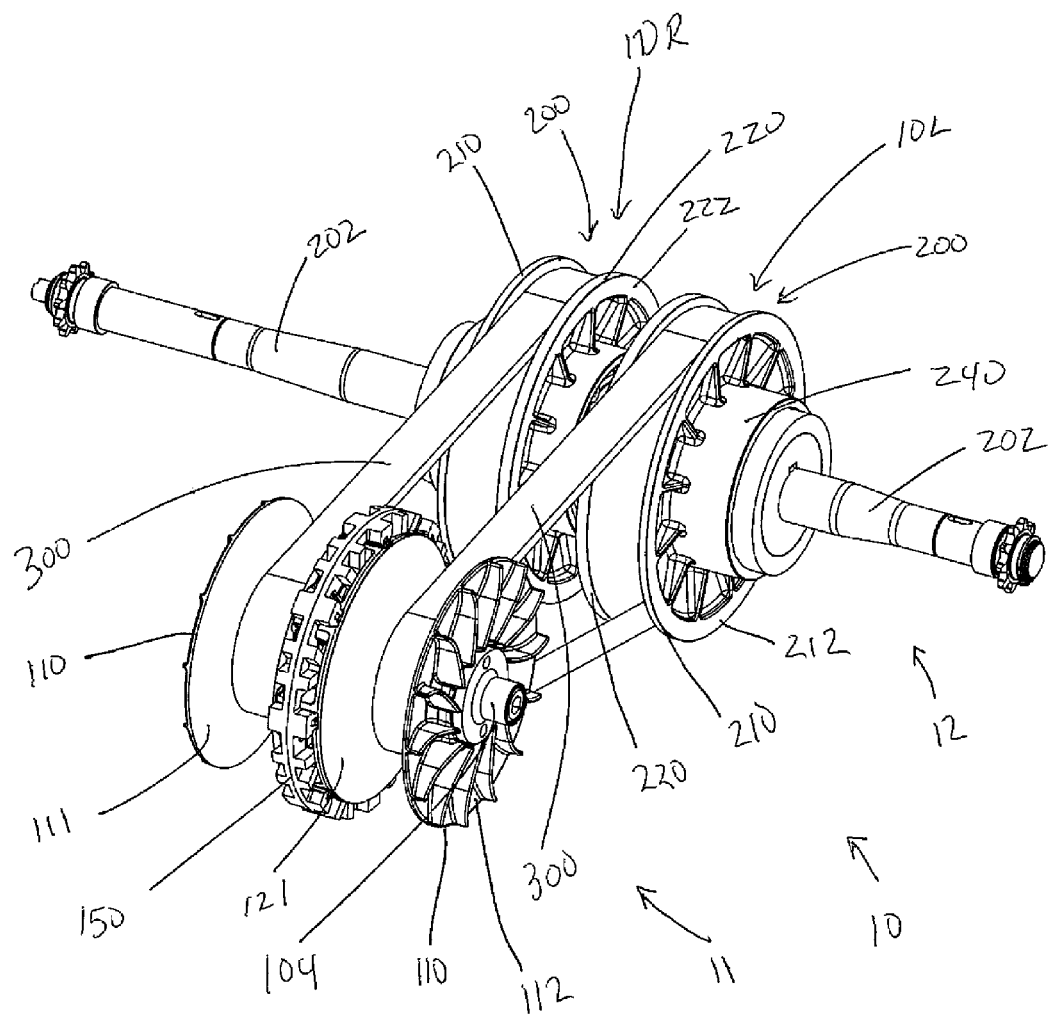
FIG. 3E is a perspective view taken from the top, left side of the continuously variable transmission (CVT) of the present application shown in isolation.
Figure 3F:
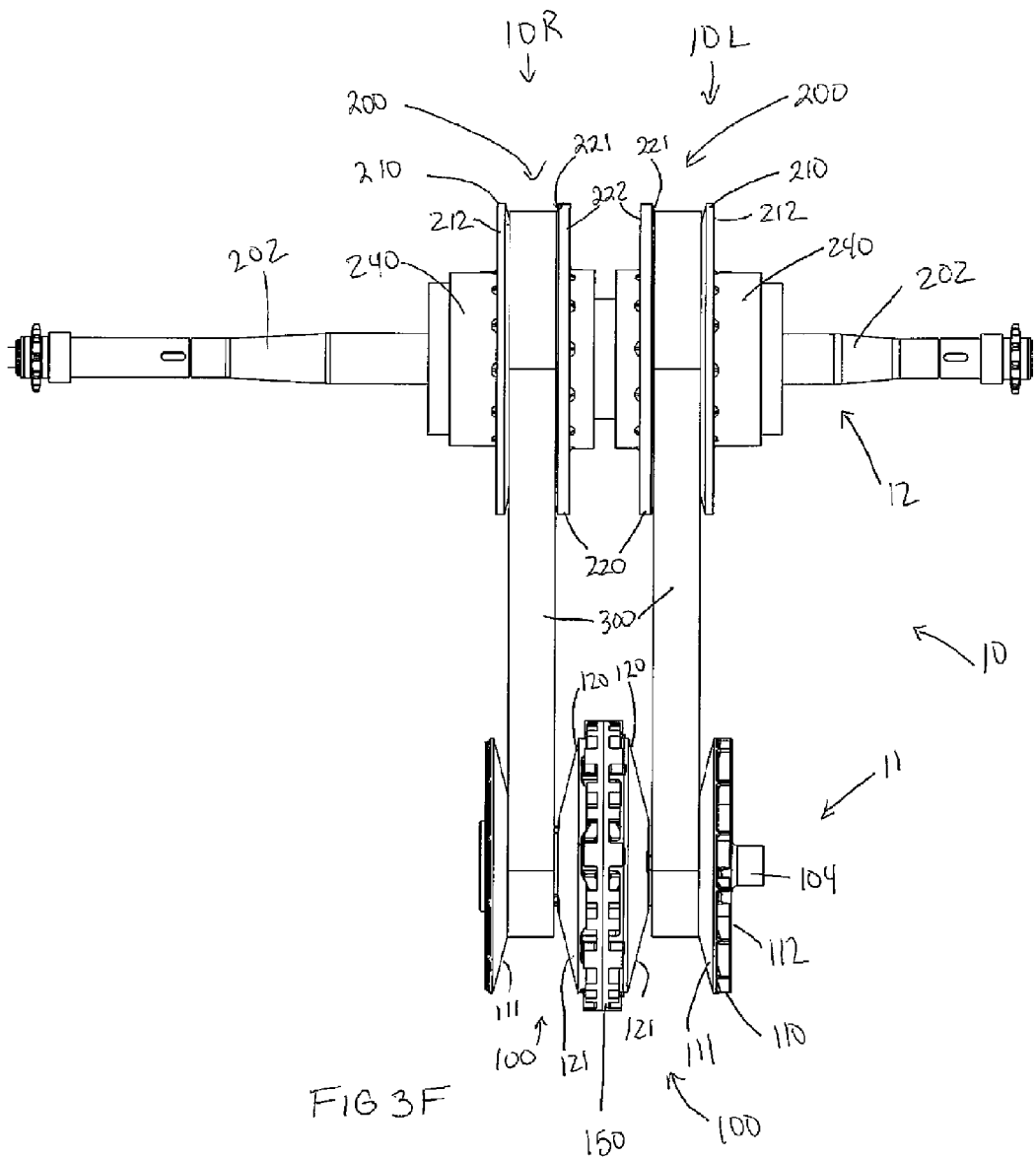
FIG. 3F is a top plan view of the CVT of the present application shown in isolation.

As can be seen in FIG. 3D, the ddCVT 10 is housed in a closed housing chamber 320 having an inlet 322 for drawing in cool air to cool the ddCVT 10, and an outlet 324 from which the heated air exits the housing 320 after cooling the ddCVT system 10.

Driver Pulley Assembly

The driver pulley assembly 11 will now be discussed with reference to FIGS. 4, 5A and 5B. The outer sheaves 110 of the driver pulley assembly 11 are fixed sheaves 110, mounted at an end of the main shaft 102 and fixed with respect to motion in the axial direction of the main shaft 102. The inner sheaves 120 of the driver pulley assembly 11 are moveable sheaves 120, mounted near the middle of the main shaft 102 and moveable along the main shaft 102 towards and away from the corresponding fixed driver sheaves 110 to vary the diameter of the driver pulleys 100. The fixed and moveable sheaves, 110 and 120, are coupled to the main shaft 102 to rotate as a unit with the main shaft 102 about its longitudinal axis. The driver pulley assembly 11 can be constructed in several different configurations depending upon the desired combination of torque and speed required by the ddCVT. In one embodiment one of the outer sheaves 110 is fixed and the other is moveable and controlled by a variator and the inner sheaves 120 are moveable. In yet another embodiment both outer sheaves 110 are moveable and controlled by variators and the inner sheaves 120 are moveable. Again in each configuration the fixed sheave or sheaves are fixed rotationally and axially to the main shaft 102, the moveable sheave or sheaves are fixed rotationally but not axially to the main shaft 102. This allows the fixed and moveable sheaves that are coupled to the main shaft to rotate as unit with the main shaft 102 about the longitudinal axis.

The roller weight assembly 150, comprising a roller weight guide 152, a plurality of roller weights 154, and a plurality of roller weight buttons or sliders 156, is centered by and located between the left and the right moveable sheaves 120L and 120R. The roller weight assembly 150 is coupled to the moveable sheaves 120, 120 to form a clutch/variator for rotating with the main shaft 102 and for moving the moveable sheaves 120, 120 along the main shaft 102 towards and away from the corresponding fixed sheaves 110, 110.

Figure 4A:
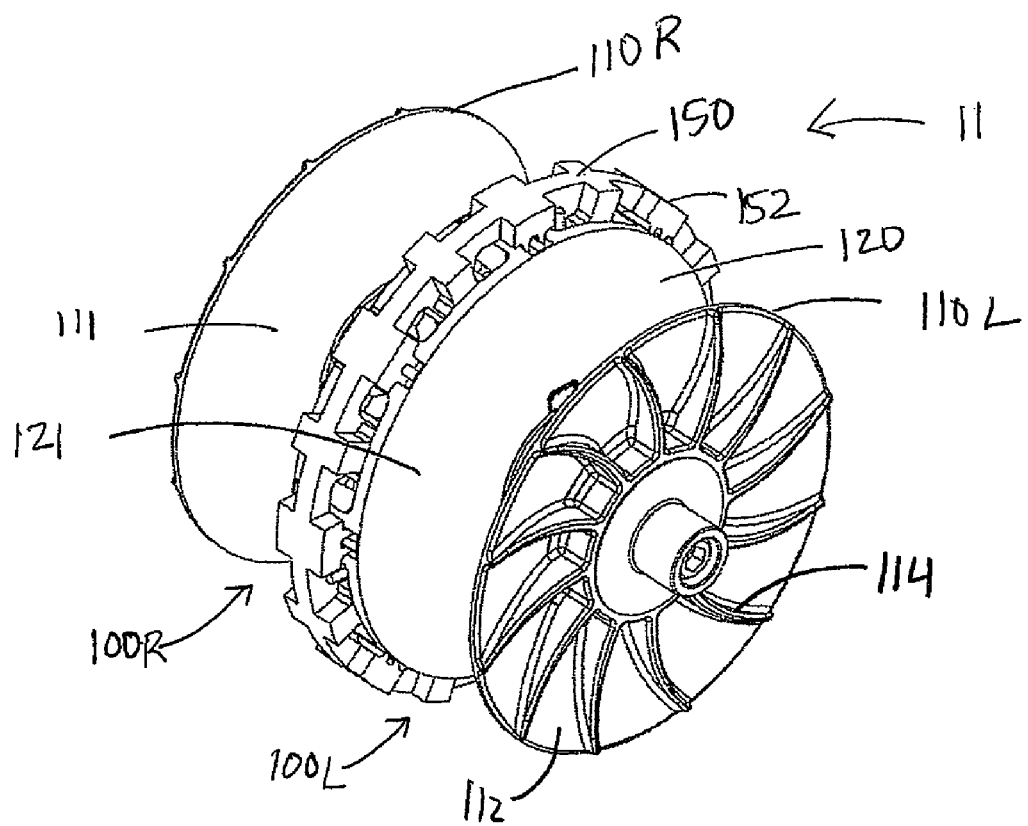

The fixed and moveable sheaves 110 and 120, respectively, and the roller weight guide 152 are annular structures, each having an outer periphery and an inner periphery best viewed in FIGS. 4A, 4B and 4C. As explained above, opposing surfaces, 111 of fixed sheaves 110 and 121 of moveable sheaves 120, of each driver pulley 100 have opposing cones. The surfaces 122 of the moveable sheaves 120 facing the roller weight guide 152 have ramp structures 125, 128, which couple to the roller weight assembly 150, which will be discussed in further detail below. The outer surface 112 of the left fixed driver sheave 110 has fin-like structures 114.

The left fixed sheave 110 is in proximity to the air inlet 322 of the chamber 320 housing the ddCVT 10, and the fin-like structures 114 act as impellers drawing air through the inlet 322 into the chamber 320 for cooling the ddCVT 10 (FIG. 3D). It is contemplated that the outer surface 212 of the left outer torque-sensing sheave 210 could have fin-like structures and that the air inlet could be disposed near the driven pulleys 200 instead of the driver pulley 100. The outer surface of each steering sheave is designated 222 the Figures. It is also contemplated that chamber 320 has more than one air inlet. It is contemplated that the ddCVT 10 could be housed in a partially closed chamber or not be housed in a closed chamber in which case the fin-like structures 114 on the left fixed sheave 110 may not be needed for cooling. The fin-like structures 114 (FIG. 4A) on the left fixed sheave 110 can also be omitted if the ddCVT 10 is housed in a closed chamber is provided with other means of cooling.

With reference now to FIGS. 5A and 5B, the main shaft 102 is a hollow shaft, having a pair of coaxial and adjacent left and right spring holders 106, 106 disposed inside. A driver spring 105 is disposed within the adjacent spring holders 106 between end walls 107 at their outer ends. The spring holders 106, and the driver spring 105 are coaxial with the main shaft 102 and rotate with it. The left and right spring holders 106 are moveable in the axial direction and coupled to the moveable sheaves 120. The left and right movable sheaves 120, 120 are coupled to the spring holders 106, 106 of the opposite side by keys 108 (FIG. 5A) such that when the moveable sheaves 120, 120 are moved away from each other (by the roller weight assembly 150, as discussed below), the spring holders 106, 106 are pushed closer together compressing the spring 105. The end wall 107 of the left spring holder 106 is in the form of a removable cap to facilitate assembly and maintenance. In an alternative embodiment the end wall 107 is fixed and cannot be removed.

The crankshaft 14 of the engine 8 is inserted from the right side into the main shaft 102 through the right collar 104 and the end wall 107 of the right spring holder 106 into the center of the spring 105. A cap screw 109 is inserted from the left side into the main shaft 102 through the left collar 104 and the end wall 107 of the left spring holder 106 into the end of the crankshaft 14 in the center of the spring 105 to fasten the driver pulley assembly 11 together. The preload of the cap screw 109 creates a friction force between the clamped elements (104, 110, 102, 110, 190) resulting in the elements rotating as a unit with the crankshaft. The moveable sheaves 120 and the roller weight assembly 150 are rotationally coupled together to rotate as a unit. The moveable sheaves 120 are rotationally coupled to the main shaft 102 by a plurality of keys 108 so that moveable sheaves 120 and the roller weight assembly 150 rotate as a unit with the crankshaft 14.

In this embodiment, the crankshaft 14 of the engine 8, is connected to the main shaft 102 from the right side, however, in other embodiments, the crankshaft 14 can be connected to the main shaft 102 from the left side. The moveable sheaves 120 and the roller weight assembly 150 will be discussed in more detail below.

Roller Weight Assembly

Figure 11:
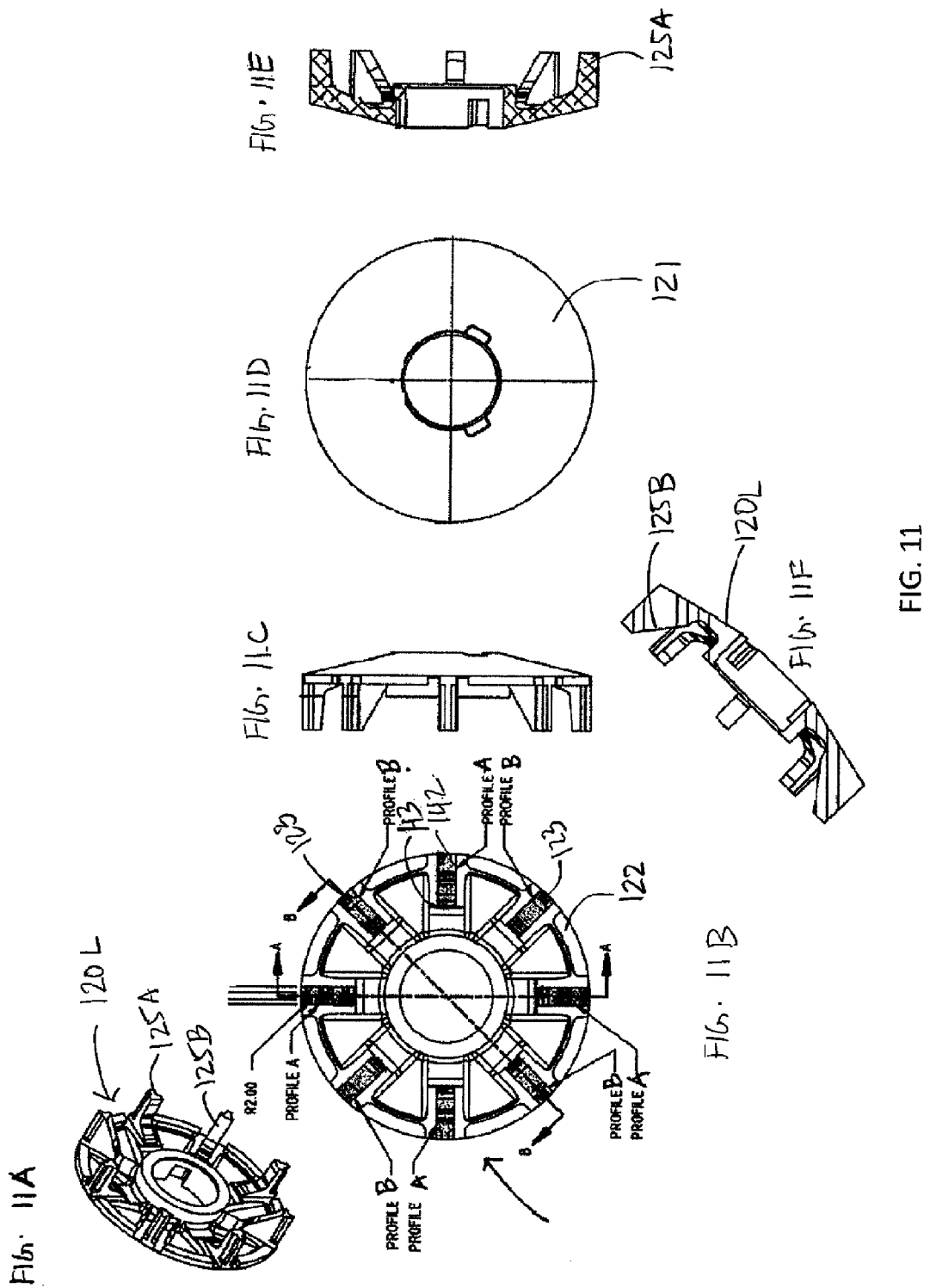
FIG. 11 shows various views of a male moveable sheave of the CVT of FIG. 3E.
Figure 12:
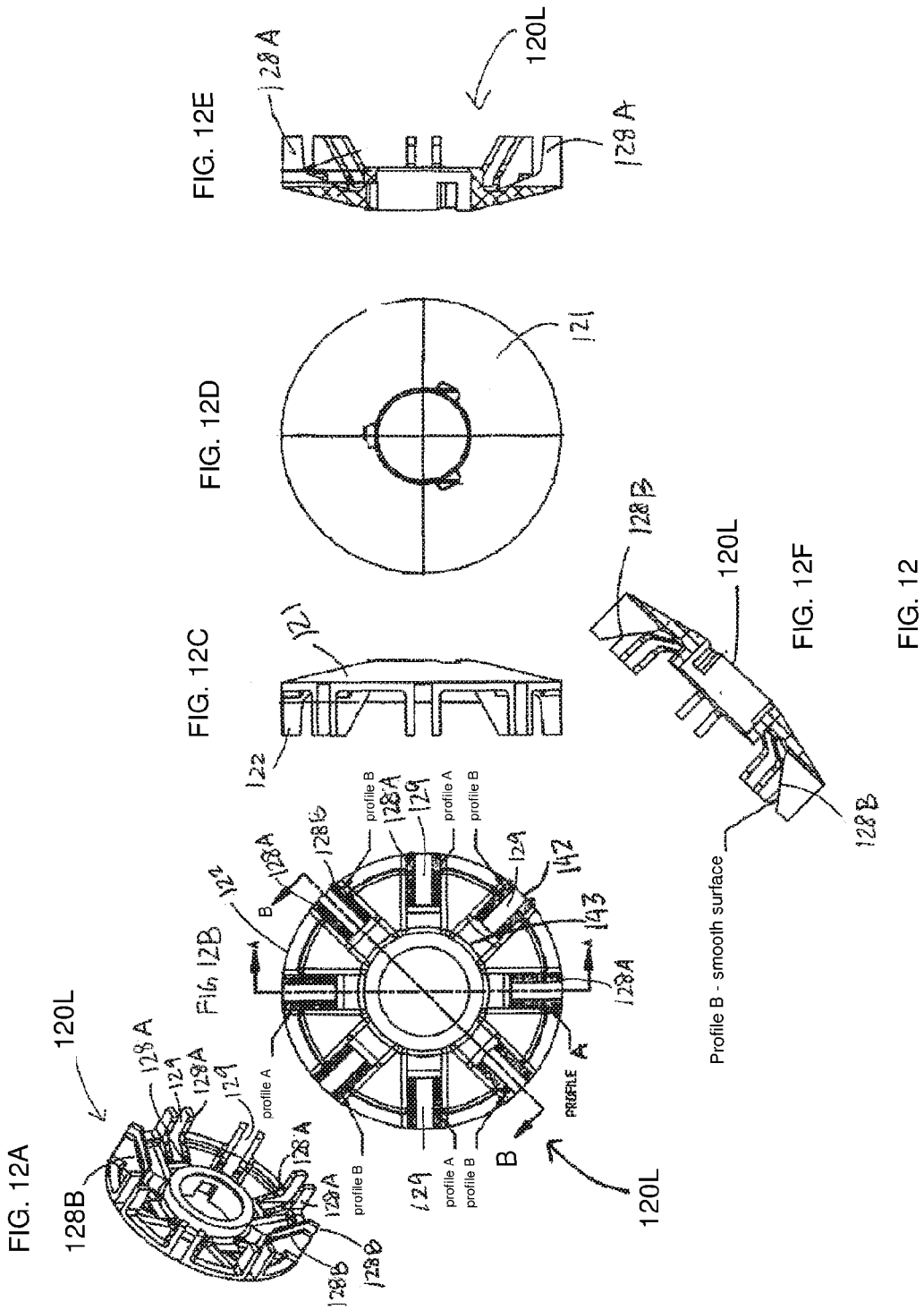
FIG. 12 shows various views of a female moveable sheave of the CVT of FIG. 3E.
Figure 13:
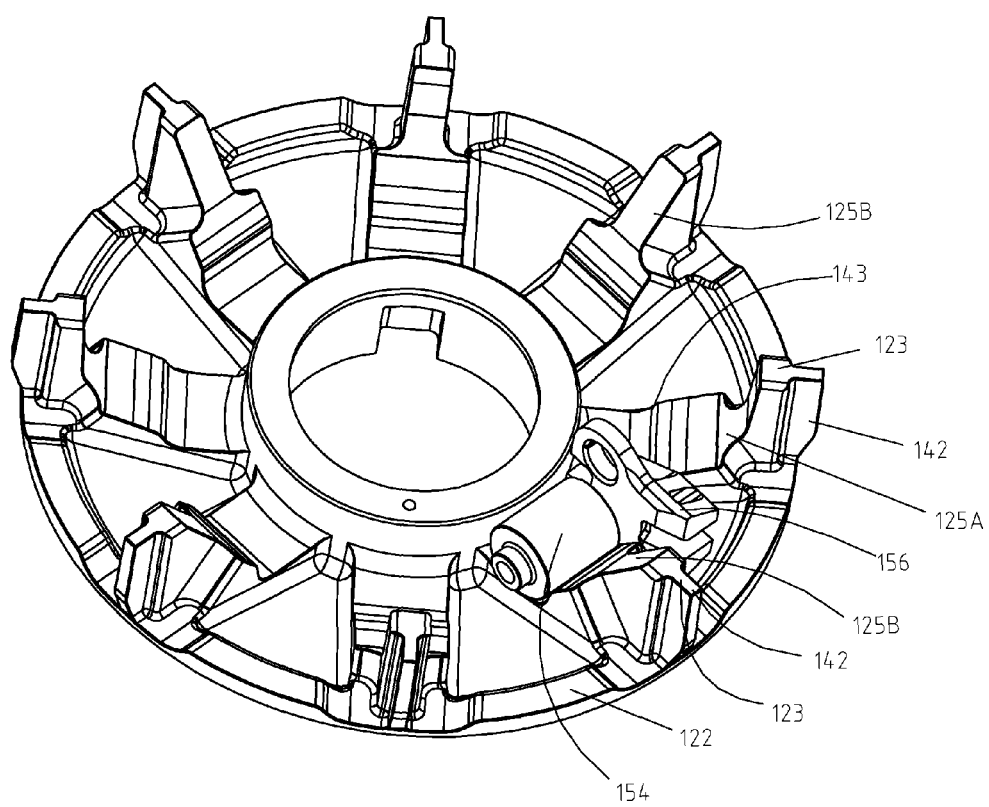
FIG. 13 is a perspective view, taken from a front, right side, of a portion of the roller weight assembly of the CVT of FIG. 3E showing a portion of the male moveable sheave with a roller weight button or slider and a roller weight mounted thereon.
Figure 14:
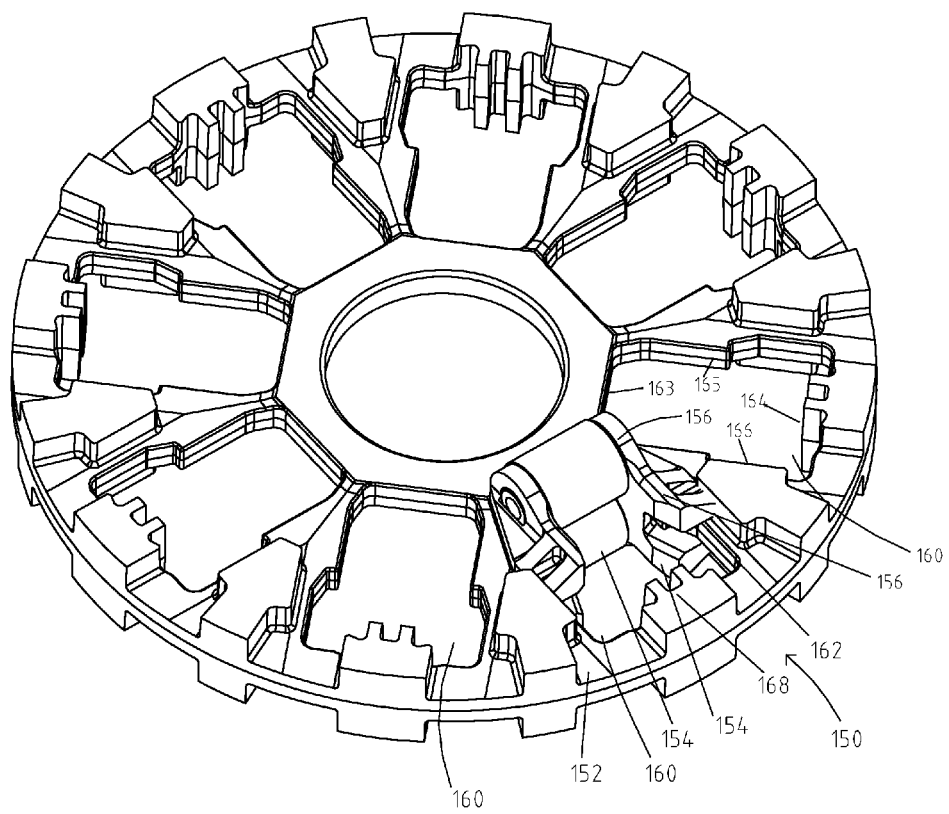
FIG. 14 is a perspective view, taken from a front, right side, of a portion of the roller weight assembly of the CVT of FIG. 3E showing a portion of the roller weight guide with a roller weight button or slider and a pair of roller weights mounted thereon.
Figure 15:
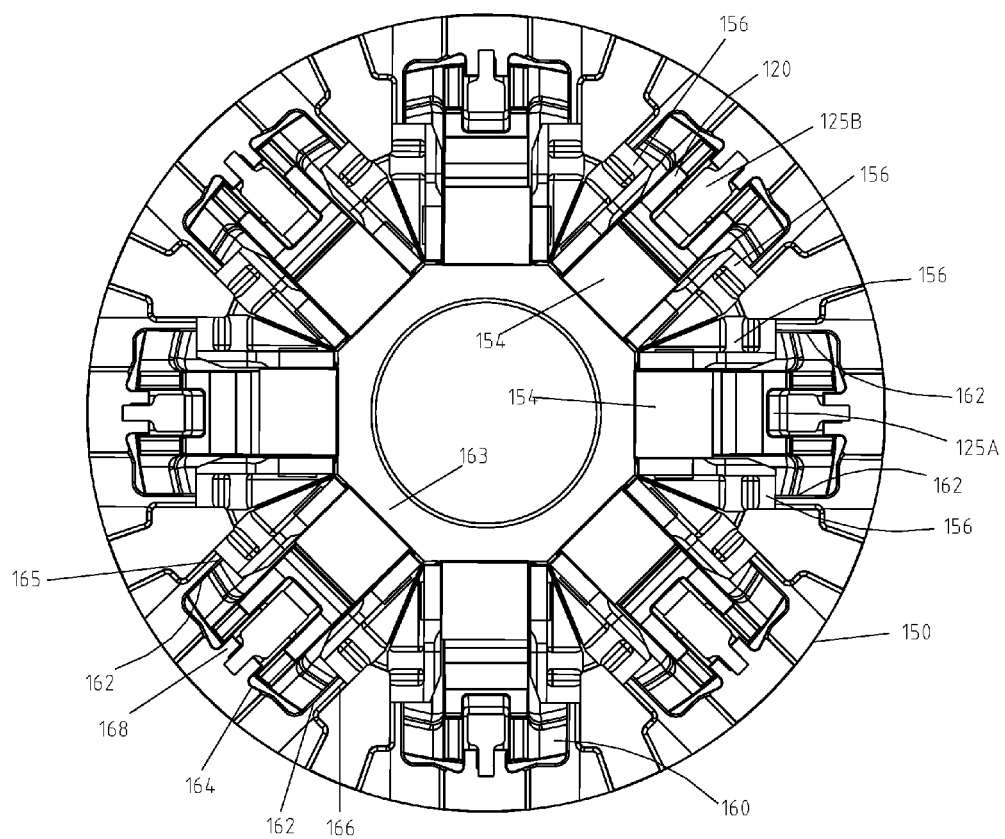
FIG. 15 is a left side elevation view of the roller weight assembly of the CVT of FIG. 3E, with the female moveable sheave removed for clarity, and showing the male moveable sheave and the roller weight guide having mounted thereon a plurality of roller weight buttons or sliders and pairs of roller weights.

Turning to FIGS. 5 to 16, the roller weight assembly 150 will now be discussed. With reference to FIGS. 13, 14 and 15, the roller weight assembly 150 comprises a roller weight guide 152, a plurality of roller weight buttons or sliders 156, a plurality of roller weights 154 and a plurality of ramp structures, 125 and 128. The roller weights 154 are rotatably mounted on a pair of opposing roller weight buttons or sliders 156 which are slidably mounted on roller weight guide 152. The roller weight guide 152 is mounted on the main shaft 102 between the two movable sheaves 120. The ramp structures, 125 and 128, are formed on the surface 122 of the moveable sheaves 120, 120 adjacent to the roller weight guide 152.

With reference to FIGS. 11, 12 and 13, moveable sheaves 120 have radially extending ramp structures, 125 and 128, on the surfaces 122 facing the roller weight guide 152. As can be clearly seen in FIG. 11, the right moveable driver sheave 120 has eight equally spaced ramps 125 comprising alternating ramps 125A and 125B. Each ramp, 125A or 125B, generally referred to as ramp 125, extends radially from an outer edge 142 near the outer periphery to an inner edge 143 near the inner periphery of the moveable sheave 120. The height of ramp 125 (with respect to a plane perpendicular to the axial direction of the main shaft 102) generally increases from the inner edge 143 towards the outer edge 142, varying according to ramp profile A for ramp structure 125A and according to ramp profile B for ramp structure 125B which will be discussed in more detail below. Similar configurations apply for ramp structures 128A, 128B. In one embodiment all the ramps 125 are shown to have the same length (in the radial direction) and width (in the tangential direction), however, different ramps 125 on a moveable sheave 120 can have different lengths and widths. In some embodiments, the number of ramps 125, on a moveable driver sheave 120 could be different from eight, for example 3, 4, 5 or more. The ramp profiles the ramp structures 125 and 128 can be manufactured in many configurations and combinations by changing the slope, height, width, length or any combination thereof of the ramp profiles (902, 904, 906), including but not limited to and embodiment where the ramp profiles of the ramp structures 125A and 125B are identical. Thus the ramp profiles within the moveable sheaves 120 of the ddCVT can be configured for harsher engagements used for racing vehicles, for smoother engagements used for recreational vehicles or for engagement at higher or lower engine speeds to administer more torque as required.

Figure 10:
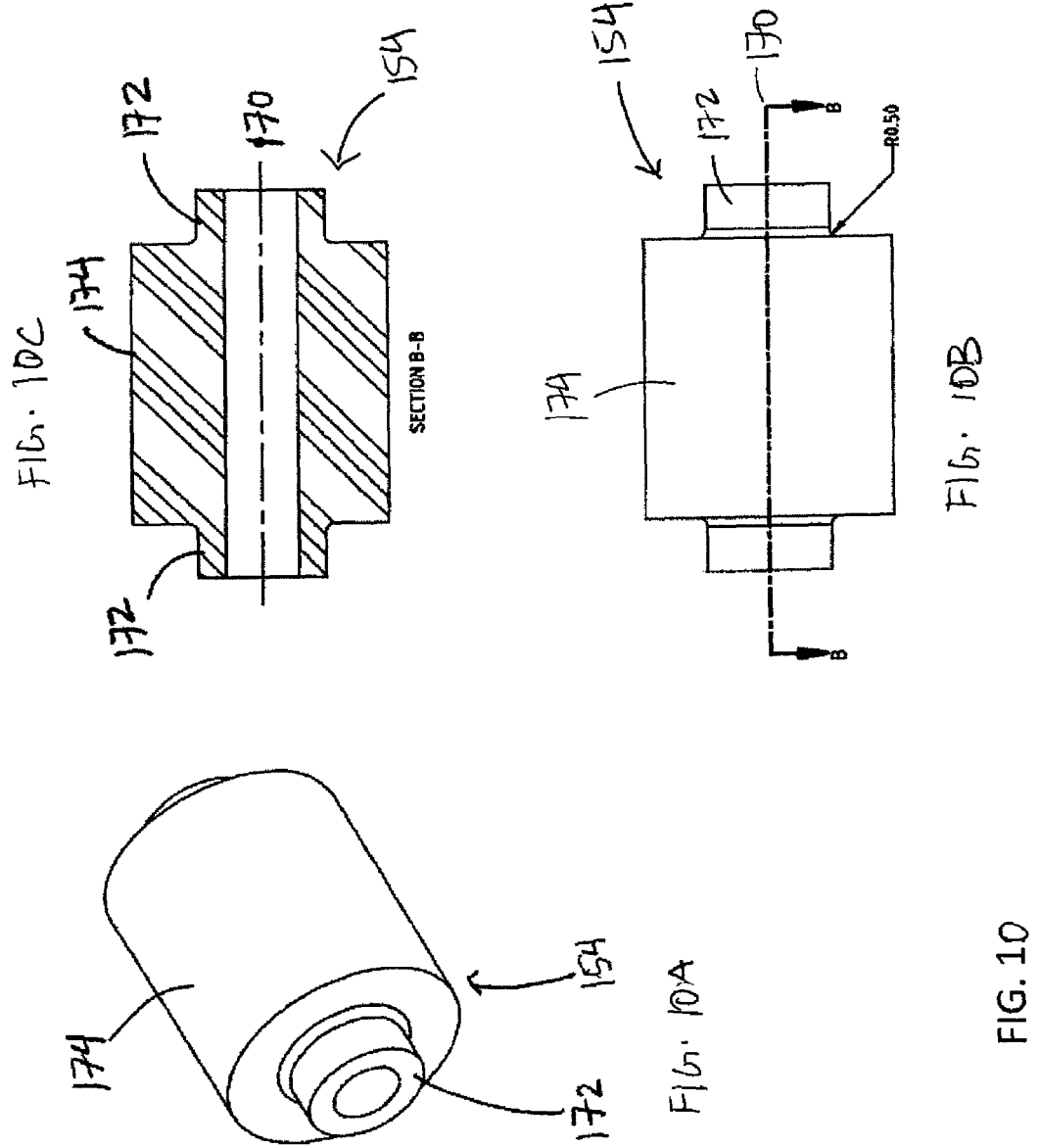
FIG. 10 shows various views of a roller weight of the CVT of FIG. 3E.

With reference to FIG. 10, a roller weight 154 has a hollow cylindrical body portion 174 that rolls along the surface of the ramp 125, 128. Two mounting portions 172 at opposite ends of the cylindrical body 174 and coaxial with its cylindrical (or rolling) axis 170, are received in corresponding mounting holes 184 in the roller weight button or slider 156. The mounting portions 172 have a smaller diameter than the cylindrical body portion 174, however, it is also contemplated that the diameter of the mounting portions 172 could be equal to that of the cylindrical body 174. As shown, the mounting portions 172 are formed integrally with the cylindrical body 174, however, it is contemplated the mounting portions 172 can be formed separately, for example, of a different material, and attached to the cylindrical body 174, for example, by welding or with a fastener. It is contemplated that the roller weights 154 could be solid structures. It is also contemplated that the roller weights 154 could have different shapes so long as the roller weights 154 are capable of rolling or moving along the ramp structures 125, 128. For example, roller weights 154 can be wheels, have conical sections or two or more mounting positions 172. The configurations of the roller weights can be cylindrical but other shapes and configurations are possible, for example, any n-sided prism or polyhedron.

With reference to FIG. 9, roller weight buttons or sliders 156 are designed to hold a pair of roller weights 154, 154 mounted with their cylindrical axes 170 parallel to each other. Roller weight buttons or sliders 156 have a body portion 180 with two opposing surfaces, a first surface 181 coupled to the pair of roller weights 154, 154 and a second surface 182 coupled to the roller weight guide 152.

The first surface 181 has a pair of adjacent oblong mounting holes 184, 184 extending into the body portion 180 from the first surface and receiving the mounting portions 172, 172 of roller weight pairs 154, 154. The oblong mounting holes 184,184 allow rotation of the mounting portions 172 about the respective central axes 170, 170 but limit their motion in directions perpendicular or parallel to the central axes 170. The mounting holes 184, 184 are spaced apart such that roller weights 154, 154 mounted in adjacent mounting holes 184, 184 abut one other. The mounting holes 184 are through-holes extending through the body portion 180 between the first and second surfaces, 181 and 182. In some embodiments, the mounting holes 184, extending from the first surface 181 towards the second surface 182, are not through-holes. In one embodiment the mounting holes 184, 184 can be circular or can be a shape that allows rotation of the roller weight pairs 154 about the respective central axes but limits motion in directions perpendicular or parallel to the central axes of the roller weight pairs 154. In some embodiments, the pair of roller weights 154, 154 mounted in the pair of mounting holes 184, 184 do not abut each other.

Extending from the second surface 182 of the roller weight button or slider 156 are a pair of flanges 186, 186 separated by a gap in which the guide rail 162 of the roller weight guide 152 is received. The shape of the flanges 186, 186 and the gap between them is configured to allow motion of the roller weight button or slider 156 in a direction parallel to the guide rails 162 but prevent motion of the roller weight button or slider 156 in the tangential and axial directions. The flanges 186, 186 are shown extending perpendicularly from the second surface 182 of the roller weight button or slider 156, however, it is contemplated that the flanges 186 could be disposed at any angle to the second surface 182.

The gap between the flanges 186, 186 of the roller weight button or slider 156 is aligned with the gap between the mounting holes 184, 184 so that the roller weights 154, 154 mounted in the mounting holes 184, 184 of the roller weight button or slider 156 are on opposite (left and right) sides of the guide rail 162 of the roller weight guide 152.

Other structures and configurations for mounting a pair of roller weights 154 in the roller weight button or slider 156 are also contemplated. For example, the roller weight button or slider 156 could have mounting posts instead of mounting holes 184, and the roller weight 154 could have corresponding holes extending inwards from each end of the cylindrical body portion coaxial with its cylindrical axis 170 to receive the mounting posts of oppositely facing roller weight buttons or sliders 156. A single through-hole passing through the cylindrical body 174 along its cylindrical axis 170 is also contemplated for receiving the mounting posts. As another example, the roller weight 154 could have a single mounting shaft in a through-hole extending along its central axis 170, the mounting shaft could be received fixedly in mounting holes 184 of roller weight buttons or sliders 156 so that the cylindrical body 174 can rotate around the stationary mounting shaft. In some embodiments, the roller weights 154 are directly mounted on the roller weight guide 152. In another example a pair or plurality of roller weight buttons or sliders 156 can be joined together to act as a single roller weight button or slider to facilitate a larger roller weight 154.

With reference to FIGS. 8, 14 and 15, the roller weight guide 152 is an annular disc configured to hold pairs of roller weights 154, 154 mounted on roller weight buttons or sliders 156 and to guide the roller weights pairs 154, 154 along the surface of the ramps, 125 and 128, of the adjacent moveable sheaves, 120L and 120R. The configuration of the roller weight guide 152 is preferably annular, however, in other embodiments the configuration of the roller weight guide may be square, octagonal, hexagonal or any other shape that when centrifugal force is applied during rotation causes the roller weights 154 and roller weight buttons or sliders 156 to move radially outwards in the roller weight guide 152. Accordingly, the roller weight guide 152 has eight radially distributed ramp windows 160 arranged to coincide with the ramp structures, 125 and 128, and the shapes of the ramp windows 160 are adapted to accommodate the shapes of the ramp structures, 125 and 128. The ramp windows 160 extend radially along the roller weight guide 152 between two opposite edges: an inner edge 163 near the center of the roller weight guide 162 and an outer edge 164 near the outer periphery of the roller weight guide 152. Two parallel edges, 165 and 166, extend between the edges 163, 164. The inner and outer edges, 163 and 164, are parallel to each other and extend in the tangential direction. In some embodiments, the inner and outer edges, 163 and 164, are not parallel, and in some other embodiments, the edges 163 and 164, extend in a circumferential direction. In embodiments where the roller weight guide is manufactured in a two piece design the parallel edges 165, 166 are absent.

Guide rails 162, 162 extend along the parallel edges 165, 166 of the ramp windows 160. When the roller weight guide 152 is placed adjacent to a moveable sheave 120, the ramp structures 125 extend in the radial and axial direction in the middle of the ramp windows 160 with the guide rails 162, 162 of opposite edges, 165 and 166, extending parallel to the ramp structures 125 on either side of it. A flange 168 extends radially inwards from the outer edge 164 into the ramp window 160 for mating with a complementary flange 123 (FIG. 11) of the ramp structures 125 and 128. Although ramp structures 125 were outlined above similar configurations and arrangements are used for ramp structures 128.

All of the ramp windows 160 are shown to be identical. In other embodiments, however, the ramp windows 160 of a roller weight guide 152 could be different, for example, to accommodate different types of ramp structures 125 on the moveable sheave 120, or to accommodate different types of roller weights 154 or roller weight buttons or sliders 156 on the same roller weight guide 152.

As best seen in FIG. 14, the guide rails 162 are complementary to the flanges 186 of the roller weight buttons or sliders 156. The guide rail 162 fits in the gap between the flanges 186 of the roller weight button or slider 156. The separation between the opposite guide rails 162, 162 of opposite edges 165, 166 of a ramp window 160 is configured to accommodate a roller weight 154 mounted between a pair of facing roller weight buttons or sliders 156, 156 mounted on the opposite guide rails 162, 162. The roller weight button or slider 156 and the roller weight guide 152 are contemplated to have other complementary sets of structures. For example, the roller weight button or slider 156 could have a flange that is configured to slide in a complementary slot extending radially along the roller weight guide 152.

As best seen in FIGS. 14 and 15, the rolling axis 170 of each roller weight 154 held between facing roller weight buttons or sliders 156, 156 mounted on opposing guide rails 162, 162 of a ramp window 160, is in a tangential direction of the roller weight guide 152. Each of the pair of roller weights 154, 154 held between the facing roller weight buttons or sliders 156, 156 abuts a moveable sheave 120 on one side of the roller weight guide 152. The roller weight guide 152 is placed between the left and right moveable sheaves 120, 120 so that their ramp structures, 125 and 128, coincide with the ramp windows 160, and the roller weights 154 abutting ramp structures, 125 and 128, are able to roll along the ramp structures, 125 and 128, when the roller weight buttons or sliders 156 slide along the guide rails 162.

The roller weights 154, roller weight buttons or sliders 156 and the roller weight guide 152 rotate along with the main shaft 102. Centrifugal force experienced during rotation causes the roller weights 154 and roller weight buttons or sliders 156 to move radially outwards in the roller weight guide 152. The roller weight buttons or sliders 156 slide radially outwards along the guide rails 162 and the roller weights 154 roll radially outwards and upwards along corresponding ramp structures, 125 and 128.

Figure 6A:
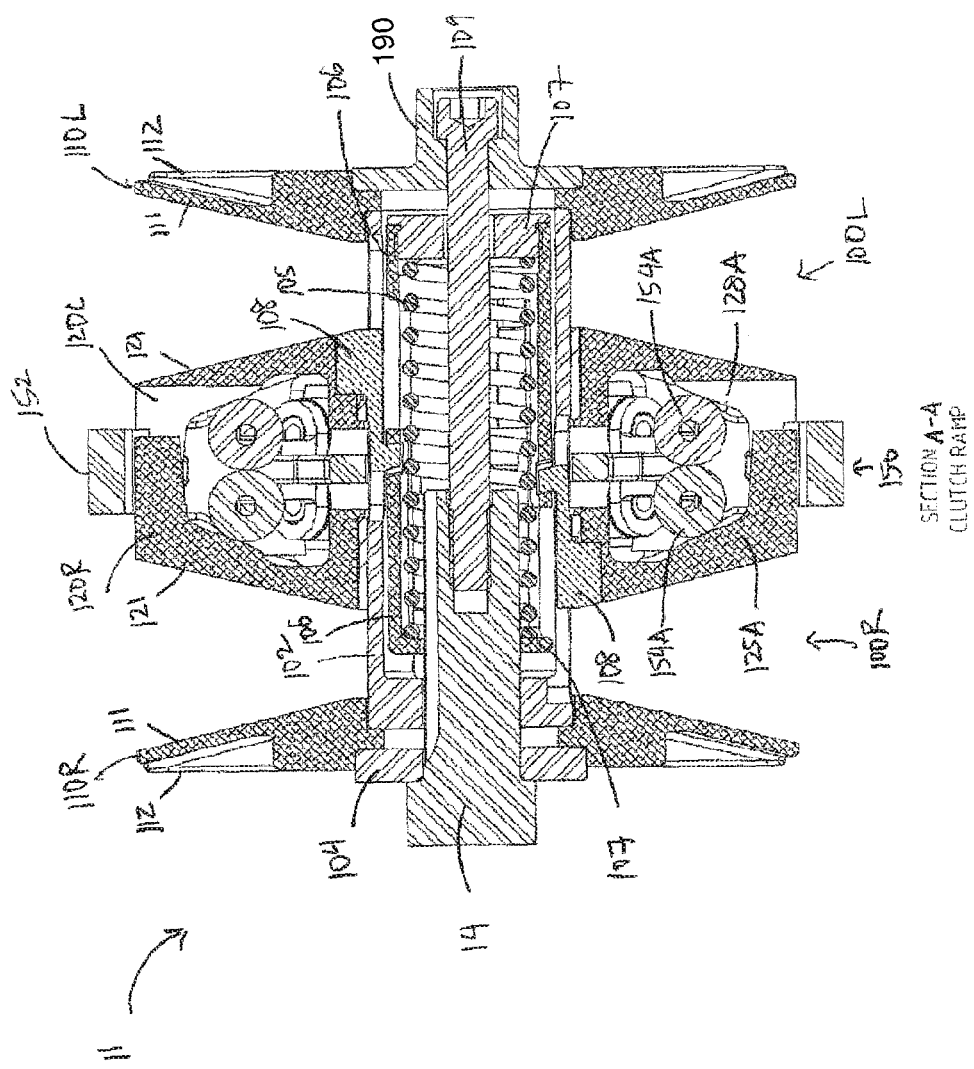
FIGS. 6A and 6B are cross-sectional views, taken respectively along the line A-A and B-B, of the driver pulley assembly of FIG. 3E showing the driver pulley assembly in an underdrive configuration, with the belt removed for clarity.
Figure 6B:
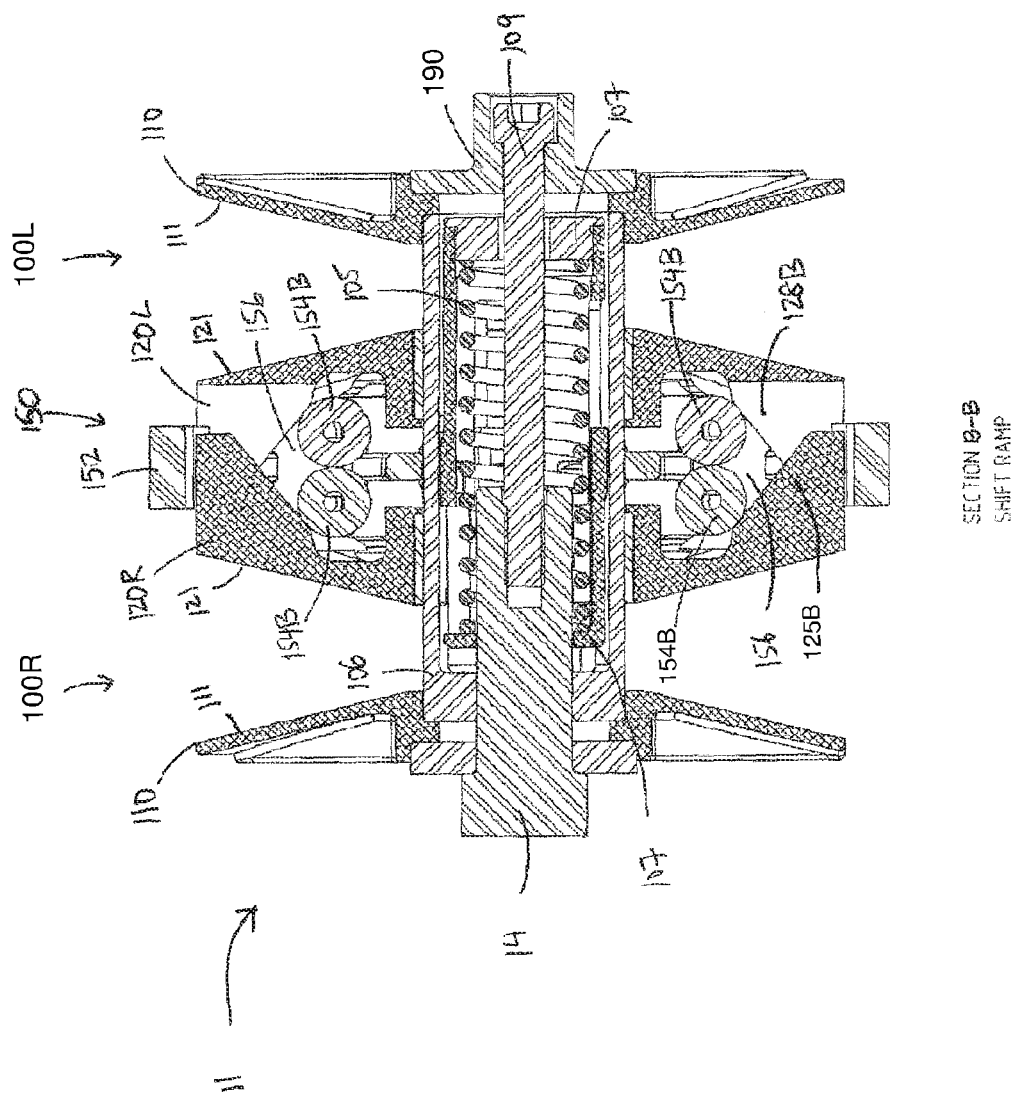
Figure 7A:
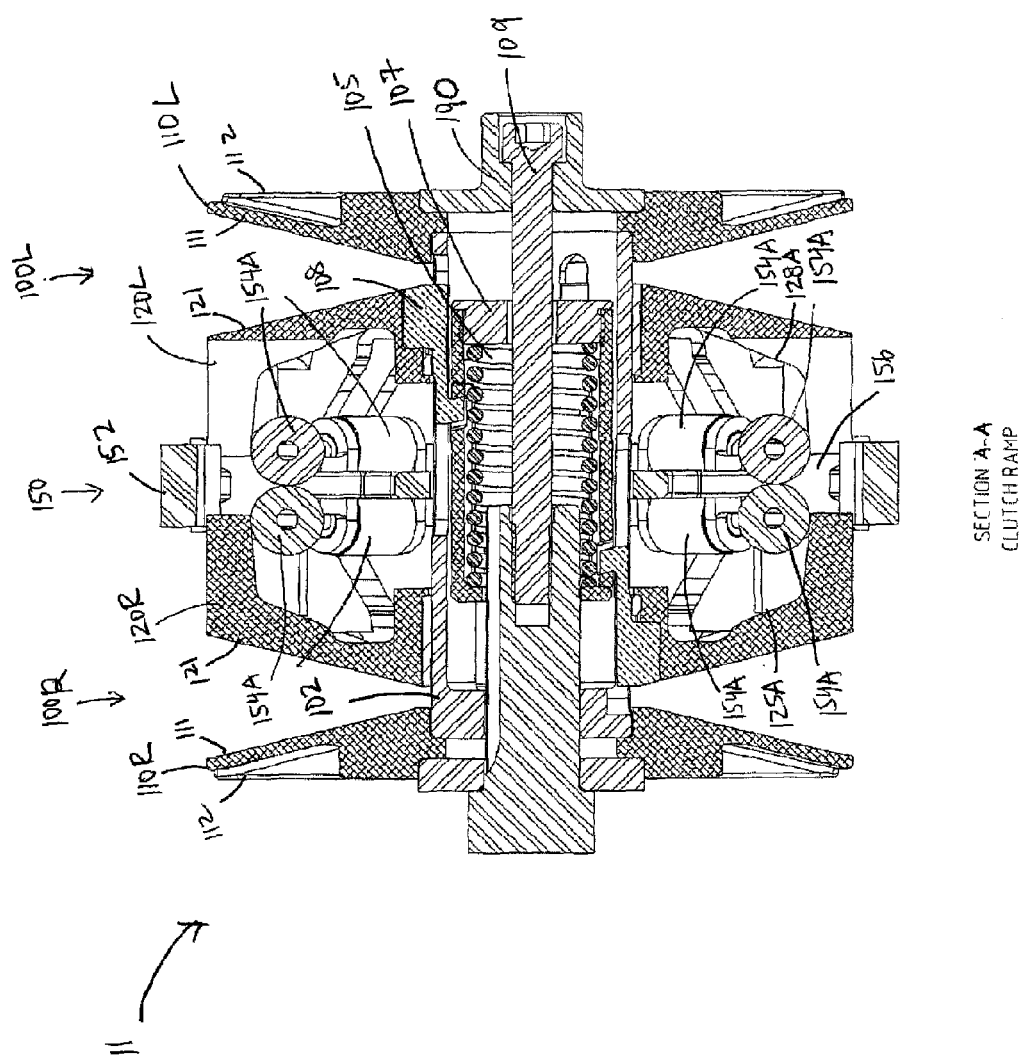
FIGS. 7A and 7B are cross-sectional views, taken respectively along the line A-A and B-B, of the driver pulley assembly of FIG. 3E showing the driver pulley assembly in an overdrive configuration, with the belt removed for clarity.
Figure 7B:
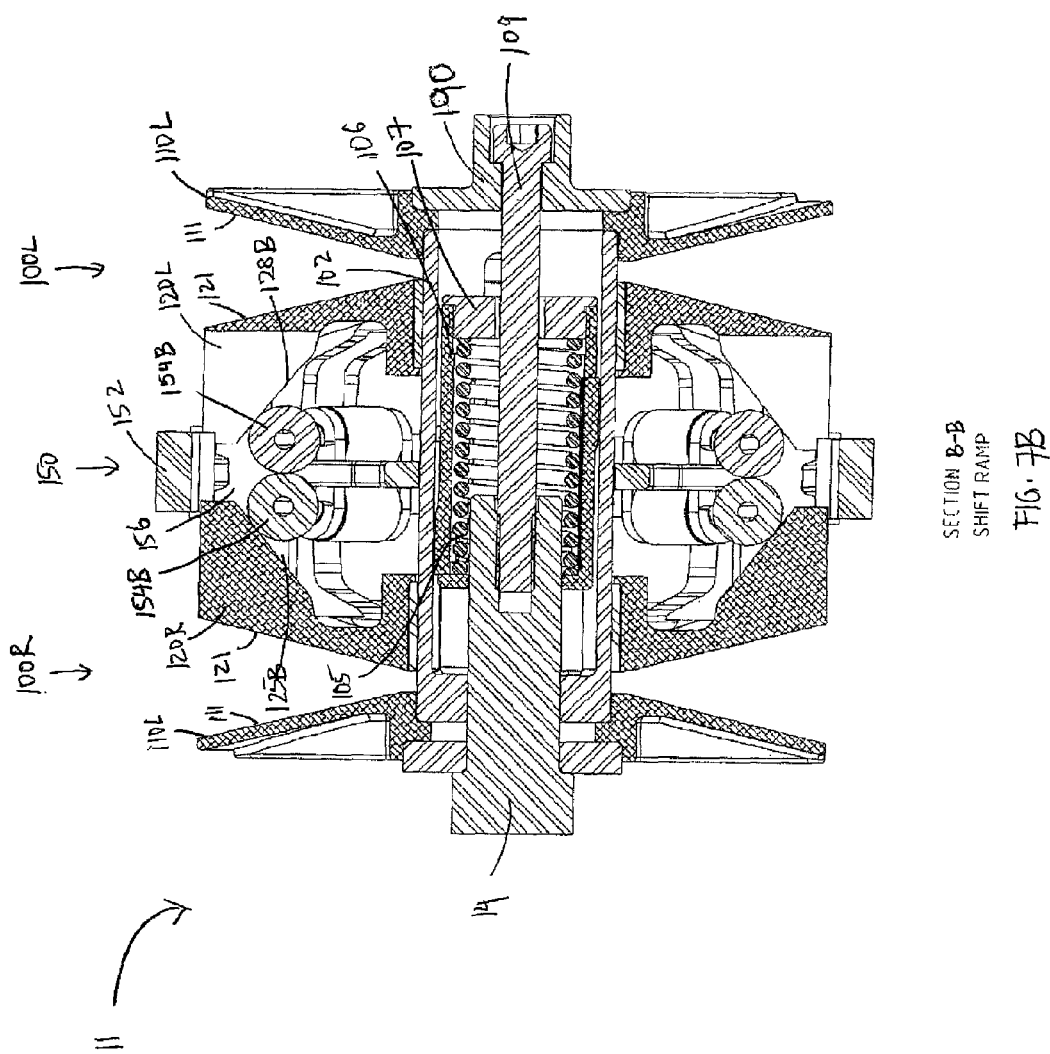

With reference to FIGS. 5A, 5B, 6A, 6B, 7A and 7B, as the pair of roller weights 154, 154 move up the ramp structures, 125 and 128, the moveable sheaves 120, 120 are pushed away from the roller weight guide 152 and towards the corresponding fixed driver sheaves 110, 110 in order to accommodate the roller weights 154, 154 rolling up the corresponding ramp structures, 125 and 128. When the separation between the moveable sheaves, 120 and the fixed sheaves 110, decreases, the belts 300 held between the moveable sheaves, 120 and the fixed sheaves 110, are pushed radially outwards, thereby increasing the effective diameter of the left and right driver pulleys 100, 100, and changing the configuration of the ddCVT from disengaged (FIGS. 5A and 5B), to engaged and underdrive (FIGS. 6A and 6B) and overdrive (FIGS. 7A and 7B).

Moveable Driver Sheaves and Ramp Structures

Turning now to FIGS. 11 to 13, 15 and 16, the moveable sheaves 120, 120 and the ramp structures, 125 and 128, of the moveable sheaves 120, 120 will be discussed in more detail. The right moveable sheave 120R is a male sheave and the left moveable driver sheave 120L is a female sheave complementary to the male sheave 120R. Each of the male and female moveable sheaves, 120R and 120L, are complementary to the roller weight guide 152 so that the roller weight guide 152 can be held between the moveable sheaves 120L, 120R with the ramp structures, 125 and 128, of the male and female moveable sheaves, 120R and 120L, coinciding with the ramp windows 160 of the roller weight guide 152.

The ramp structures 125 of the male moveable sheave 120R have a single ramp structure 125 extending along the radial direction, while the corresponding ramp structures 128 of the female moveable sheave 120L have a pair of ramps 128 separated by a gap 129 extending along the radial direction. Each ramp structure 125 of the male sheave 120R coincides with the gap 129 of the female sheave 120L. One of the roller weights 154 of the pair of roller weights 154, 154 mounted within the ramp window 160, abuts the ramp structure 125 of the male sheave 120R, while the other abuts the ramp structure 128 of the female sheave 120L.

When the roller weights 154, 154 of the roller weight guide 152 are at the bottom of the ramp structures 125, 128 the male ramp structure 125 of the male sheave 120R fits within the gap 129 of the female sheave 120L. This occurs when the moveable sheaves 120L, 120R are disposed in positions closest to one another and farthest from the corresponding fixed sheaves 110L, 110R, and the belts 300 are disengaged from the driver pulleys 100. As the roller weights 154 move up the ramp structures, 125 and 128, the ramp structure 125 and ramp structure 128 are pushed further apart, thereby pushing the male and female sheaves, 120L and 120R, away from each other and towards the corresponding fixed sheaves 110, thus engaging the belt 300 between the opposing cones, 111 and 121, of corresponding fixed sheaves 110 and moveable sheaves.

In the embodiment shown, the ramp structures 125, 128 of each moveable sheave 120 are either all of the type 125 (male) or the type 128 (female). In some other embodiments, each moveable sheave 120 has both types of ramp structure, 125 and 128. For example, each moveable driver sheave 120 could have ramp structures, 125 and 128, in an alternating pattern. In some embodiments, the moveable sheaves 120L, 120R are rotationally coupled to the roller weight guide 152, but the two moveable sheaves 120L, 120R are not rotationally coupled together. In still other embodiments only one of the moveable sheaves 120 is rotationally coupled to the roller weight guide 152.

With reference now to Figures, 5 to 7, 11, 12, 13 and 16, the ramp profiles 900 of the ramp structures, 125 and 128, will now be discussed. The male moveable sheave 120R has alternating ramp structures 125A and 125B. The female moveable sheave 120L has alternating pairs of ramp structures 128A and 128B.

As mentioned above, the height of ramp structures 125 and 128, (with respect to a plane perpendicular to the axial direction of the main shaft 102) generally increases from the inner edge 143 towards the outer edge 142, varying according to ramp profile A for ramp structures 125A and 128A, and according to ramp profile B for ramp structures 125B and 128B. As will be described below, ramp structures 125A and 128A are low speed ramps for controlling the axial position of the moveable sheaves 120 at low speeds while ramp structures 125B and 128B high speed ramps for controlling the axial position of the moveable sheaves 120 at high speeds.

The low speed or clutch ramps and the high speed or shift ramps will be discussed below with respect to ramp structures 125A and 125B of the male moveable sheave 120R, but it will be understood that the discussion also applies to the ramp structures 128A and 128B of the female moveable sheave 120L. For the purpose of the discussion below, the roller weights 154 abutting ramp structure 125A will be referred to as roller weights 154A and the roller weights 154 abutting ramp structure 125B will be referred to as roller weights 154B, although the roller weights 154A and 154B are identical in the illustrated embodiment. In some embodiments (not shown here) roller weights 154A and 154B are not identical but are capable of maintaining contact with ramp structures 125 and 128.

Figure 16:
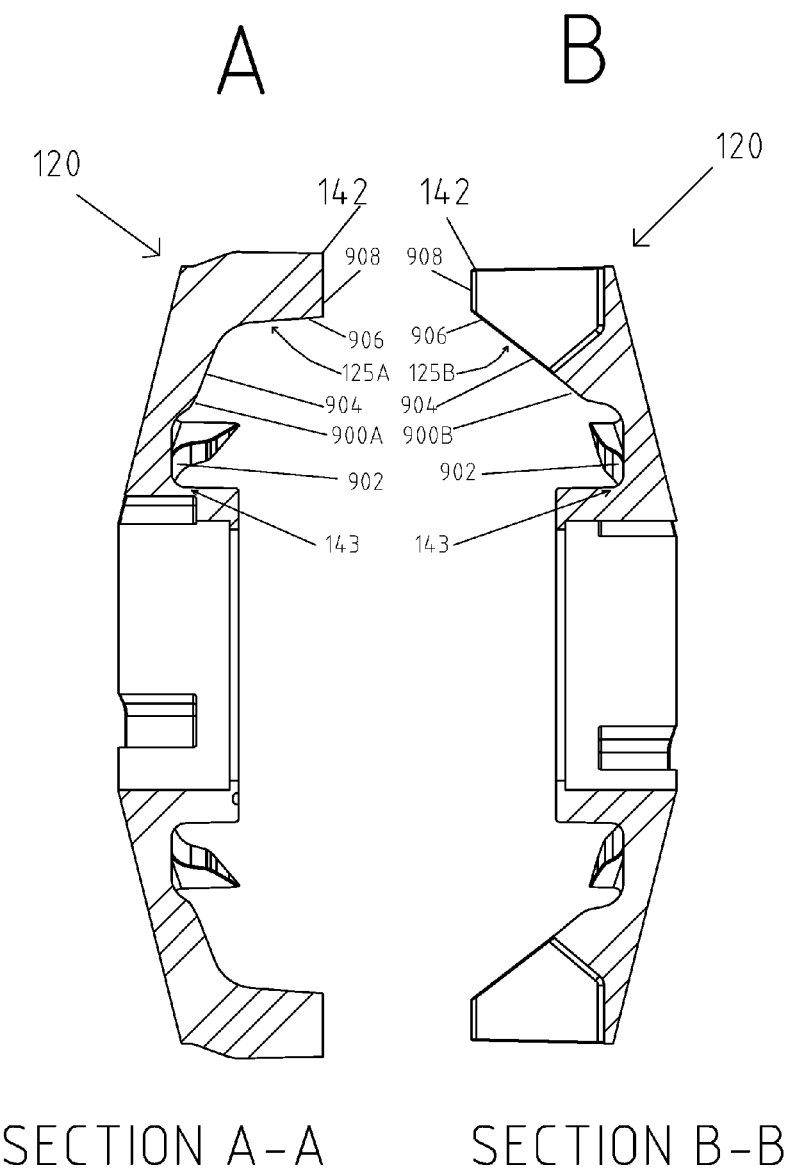
FIG. 16 is a close-up of the cross-sectional view of a low speed ramp (clutch ramp) and a high speed ramp (shift ramp) of the male moveable sheave of FIGS. 11E and 11F, taken respectively along the lines A-A and B-B.

As best seen in FIG. 16, moving radially outwards from the inner edge 143 towards the outer edge 142, the ramp structures, 125A and 125B, have a generally flat profile 902 at the bottom of the, ramp structures 125A and 125B followed by upwardly inclined middle profile 904 and a top profile 906 of the ramp structures, 125A and 125B. In one embodiment of ramp structure 125B, between the bottom and top profiles, 902 and 906, respectively, the ramp profile 900B increases linearly with a constant slope through middle profile 904. For ramp structure 125A, in first middle profile 904, the upward slope of profile 900A is less than the slope of ramp profile 900B, while nearing the top profile 906, ramp profile 900A has a steeper slope than ramp 900B. It will be appreciated that many different shapes, slopes, heights, widths, lengths, number or combinations thereof of ramp profiles of the ramp structures 125A, 125B, 128A and 128B are possible and within the design parameters recited herein to achieve different configurations of the ddCVT from disengaged (FIGS. 5A and 5B), to engaged and underdrive (FIGS. 6A and 6B) to overdrive (FIGS. 7A and 7B) or any combination thereof. As noted above the different ramp profiles within the moveable sheaves 120 of the ddCVT can be configured for harsher engagements used for racing vehicles, for smoother engagements used for recreational vehicles or for engagement at higher or lower engine speeds to administer more torque as required.

FIGS. 5A and 5B show the roller weights, 154A, 154A and 154B, 154B, respectively disposed at the bottom of ramp structures 125A, 128A and 125B, 128B, with the driver pulley assembly 11 in a disengaged configuration. When the engine rotation speed is low, the belt 300 is disengaged from the driver pulleys 100 of the ddCVT 10, the moveable sheaves 120 rotate slowly and the roller weights, 154A (abutting ramp 125A) and 154B (abutting ramp 125B), are at the ramp bottom profile 902 as best seen in FIGS. 5A and 5B. More specifically, when the vehicle 1 is at rest and the engine 8 is idling, the driver pulley assembly 11 rotates with the crankshaft 14, causing a centripetal force in the roller weights 154A and 154B. The centripetal acceleration moves the roller weights 154A and 154B radially outwards until they contact the ramp structures 125A and 125B. The ramp structures 125A and 125B split the radial force into a force that acts partially radially and partially axially. The axial force acting on the moveable sheaves 120, is opposed by the driver pulley spring 105 force coupled to the main shaft 102 via the keys 108 and the spring holders 106. At idle the spring force exceeds the axial force roller weight force, thus the moveable sheaves 120 remain fully disengaged/closed, the result being zero displacement.

As the engine rotations increase in speed, the centripetal force of the roller weights increases to the point where it overcomes the spring force and pushes the roller weights 154A and 154B radially outward and upward along the ramp structures 125A and 125B, as best seen in FIGS. 6A, 6B, 7A and 7B. Roller weights 154A on ramp structures 125A and roller weights 154B on ramp structures 125B move radially outward starting from the ramp bottoms 902, through the middle profile 904 to the top profile 906 of the ramp structures 125A and 125B.

With reference to FIG. 16, in the profile 904, ramp structures 125B, have a steeper slope than ramp structures 125A. Therefore, roller weights 154A move further outward along the middle profiles 904 of ramp structures 125A than roller weights 154B on ramp structures 125B for the same rotation speeds. As the abutting roller weight pairs 154A move outward and upward along ramp structures 125A, the ramp structures 125A are pushed apart by the abutting roller weights 154A, pushing moveable sheaves 120L, 120R away from each other towards the corresponding fixed sheaves 110, 110 thereby decreasing the distance between the fixed sheaves 110 and the moveable sheaves 120 and the belts 300 to the point where the gap is completely eliminated and the belts 300 engage.

FIGS. 6A and 6B show the roller weight pairs, 154A, 154A and 154B, 154B, respectively disposed in the first middle profile 904 of ramp structures 125A and 128A (FIG. 6A), and ramp structures 125B and 128B (FIG. 6B), with the driver pulley assembly 11 in an underdrive (low speed, high torque) configuration. Roller weights 154A move further out along profile 904 of ramp structures 125A and 128A. In one configuration roller weights 154B can remain closer to the bottom profile 902 on ramp structures 125B and 128B. In other configurations, the radial position of bottom profile 902 of the ramp profile of ramp structures 125A, 128A can be the same, greater than or less than the radial position of bottom profile 902 of the ramp profile of ramp structures 125B, 128B. In yet other configurations, the radial position of top profile 906 of the ramp profile of ramp structures 125A, 128A can be the same, greater than or less than the radial position of the top profile 906 of ramp profile of ramp structures 125B 128B so long as contact between the ramp structures 125A, 125B, 128A and 128B is maintained with the roller weights 154A and 154B.

As the rotational speed of the engine 8 increases further, roller weights 154A and 154B, move further outward along ramp structures, 125A and 125B, into top profile 906. With reference to FIG. 16, in the top profile 906, ramp structure 125A is much more steeply inclined than ramp structure 125B. Therefore, roller weights 154B exert a much larger axial force on the movable sheaves 120, 120 than roller weights 154A, and thus control the axial displacement of the main shaft 102 to a much greater extent than roller weights 154A. The combined roller weight forces push the moveable sheaves 120, 120 further apart, and push the engaged belt 300 further outwards to a larger diameter position, thereby further increasing the diameter of the driver pulleys 100, and increasing the rotation speed of the driven pulleys 200. Roller weights 154B and ramp structures 125B thus perform the shifting function for the ddCVTs 10 at high speed as can be seen in FIGS. 7A and 7B.

FIGS. 7A and 7B show the roller weight pairs, 154A, 154A and 154B, 154B, respectively disposed in the top profile 906 of ramp structures 125A, 128A and 125B, 128B, with the driver pulley assembly 11 in an overdrive configuration. In the overdrive position the ends of the spring holders 106 contact each other and act as a physical stop that prevents the movable sheaves 120 from moving further apart. In other embodiments, another part of the driver pulley assembly 11 or driven pulley assembly 12 could act as a physical stop.

The ddCVT system 10, having a roller weight assembly 150 as described above, leads to greater operational efficiency, as the separate set of low speed ramp structures 125A and high speed ramp structures 125B, can be respectively optimized for the clutching and shifting functions of the ddCVT system 10. Typically, the belt 300 of the ddCVT 10 is engaged by the fixed sheaves 110, and the moveable sheaves 120 with the engine rotations at a low revolutions per minute (rpm) (2000 rpm, for example) and relatively smaller forces on the belt 300. The shape of the low speed ramp structures 125A is adapted to engage the belt 300 with an appropriate force at low engine rotation speeds and to have a minimal role at higher engine rotations. The high speed ramp structures 125B, on the other hand, are adapted to provide optimal forces at higher engine rotation speeds and to have a minimal role at lower engine rotation speeds.

Another advantage of the roller weight assembly 150 is the use of pairs of roller weights 154, 154. In prior art systems, the roller weights 154 (which are not arranged as pairs of roller weights) move outward along a surface of the moveable sheaves 120, by sliding. Sliding between the surfaces of the roller weights 154 and the moveable sheaves 120 leads to wear and tear of the mutually contacting surfaces. In the arrangement of roller weight assembly 150 described here, each roller weight 154 rolls against the other roller weight 154 of the pair of roller weights 154, 154, and also rolls along the surfaces of the ramp structures, 125 and 128, of the adjacent moveable sheaves 120. In this configuration, sliding motion is minimized as is wear and tear of mutually contacting surfaces of the roller weights 154 and the moveable sheaves 120.

The roller weight assembly 150 being disposed between the driver pulleys 100, as in the embodiment shown in the figures, reduces the overall volume of the ddCVT system 10. It is, however, contemplated that the roller weight assembly 150 could be at an end of the driver pulley assembly 11. In this configuration the outer (fixed) sheaves 110 described above of the driver pulley 100 are moveable while the inner (movable) sheaves 120 described above are fixed, and a separate roller weight assembly 150 is provided for each of the now moveable sheaves 110 of each driver pulley 100. In yet another configuration one of the outer (fixed) sheaves 110 and one of the inner (moveable) sheaves 120 are moveable, and the roller weight assembly 150 could be coupled to the now moveable outer sheave 110. In this embodiment, the roller weight guide 152 is adapted to have roller weights 154 mounted on one side instead of both sides.

Driven Pulley Assembly

With reference to FIG. 17, the driven pulley assembly 12 comprises a pair of left and right driven pulleys 200, 200 respectively mounted on a pair of spaced and coaxial left and right drive shafts 202, 202. Each driven pulley 200 comprises an inner steering sheave 220 and an outer torque-sensing sheave, 210, which control steering and torque, respectively. Opposing surfaces, 221 and 211, of the steering sheave 220, and torque-sensing sheave 210 of each driven pulley 200 are conical and adapted to hold the belt 300 between them. In some embodiments one or more of the inner sheaves are the torque-sensing sheaves and one or more of the outer sheaves is the steering sheave. In other embodiments the inner or outer sheaves performs both the steering and torque-sensing functions.

Figure 18A:
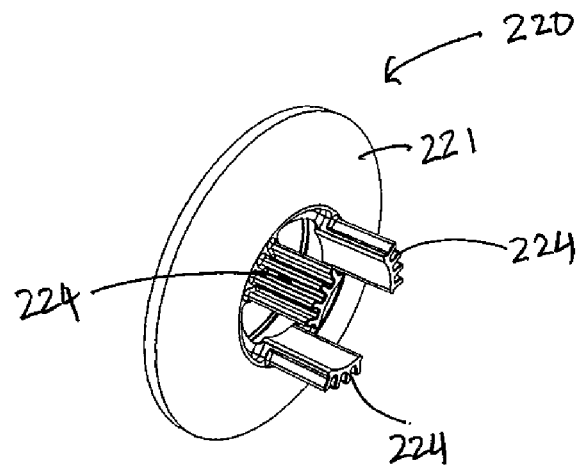
FIG. 18A is a perspective view taken from a front, left side of the left inner driven sheave of the CVT of FIG. 3A.
Figure 18B:
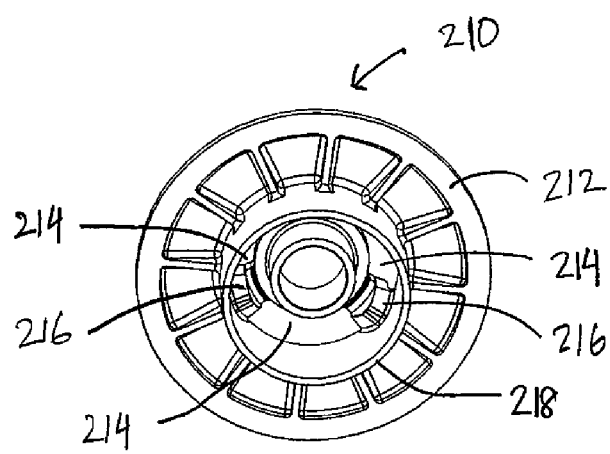
FIG. 18B is a perspective view taken from the top, left side of the left outer driven sheave of the CVT of FIG. 3A.
Figure 19A:
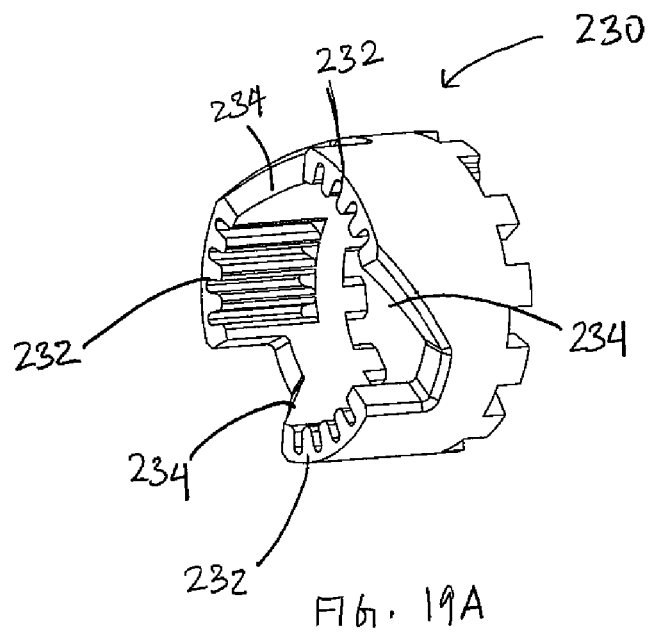
FIG. 19A is a perspective view taken from a front, right side of the left helix of the CVT of FIG. 3A.
Figure 19B:
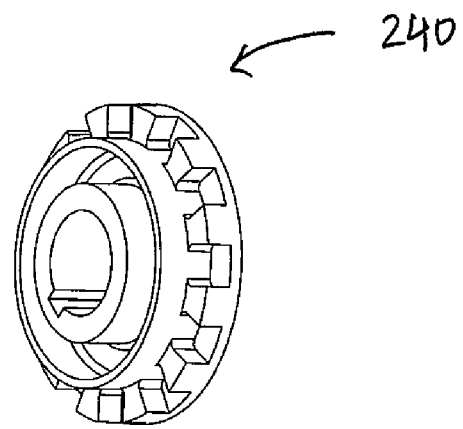
FIG. 19B is a perspective view taken from a front, right side of the left helix holder of the CVT of FIG. 3A.
Figure 19C:
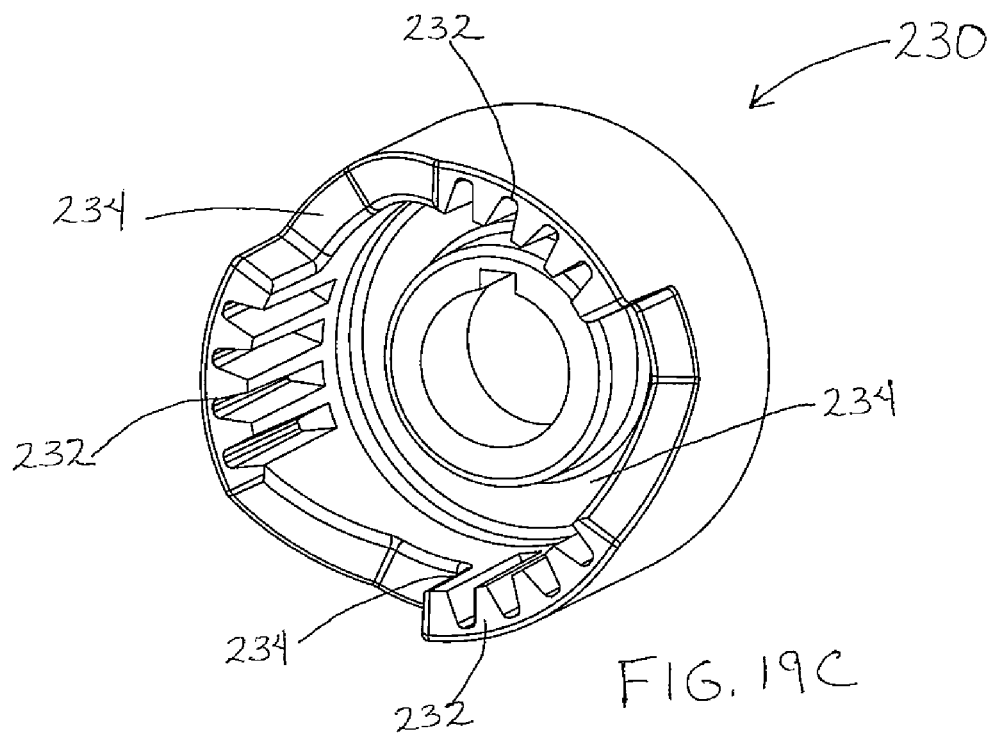
FIG. 19C is a perspective view taken from a front, right side of the left helix of the CVT of FIG. 3A depicting the left helix and left helix holder as a single piece.
Figure 19D:
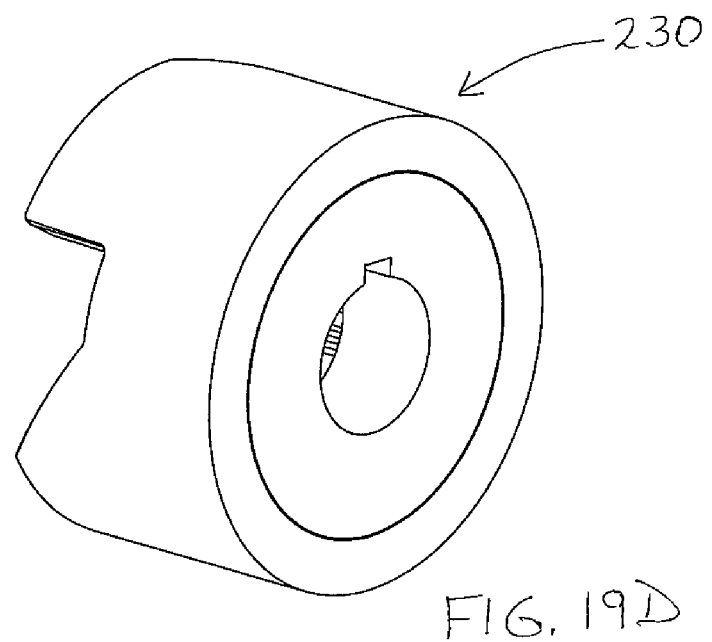
FIG. 19D is a perspective view taken from a rear, right side of the left helix and left helix holder of the CVT of FIG. 3A depicting the left helix and left helix holder as a single piece.

With reference to FIGS. 17, 18 and 19, in the left side of the driven pulley assembly 12, which is generally a mirror image of the right side of the driven pulley assembly 12, the left steering sheave 220 of the left driven pulley 200 is coupled to the left drive shaft 202 by a left helix 230 mounted adjacent to the left torque-sensing sheave 210, and a left helix holder 240 mounted adjacent to the left helix 230, on the left drive shaft 202. The left steering sheave 220 has three radially distributed splined flanges 224 (FIG. 18A) extending outward from the conical surface 221 near the inner periphery. The splined flanges 224 are inserted through three radially distributed apertures 214 of the left torque-sensing sheave 210 (FIG. 18B) to engage splined sections 232 of the rim of the left helix 230 (FIG. 19A). The rim of the left helix 230 also has ramped sections 234, which engage curved projections 216 on the surface 212 of the adjacent left torque-sensing sheave 210. The left helix 230 and the left helix holder 240 (FIG. 19B) are engaged by complementary teeth on the mutually contacting rims. The left steering and torque-sensing sheaves, 220 and 210, of the left helix 230 and left helix holder 240, mounted on the left drive shaft 202, rotate as a unit with the left drive shaft 202. In some embodiments the helix 230 and the helix holder 240 are machined as a single piece.

The left helix 230 and the left helix holder 240 are axially fixed on the left drive shaft 202. The left torque-sensing sheave 210 is moveable in the axial direction and resiliently biased against [Steve this is a "term of art" and used here to mean that the sheave is biased by the driven spring 242, please confirm that his is correct] the left helix holder 240 by a left driven spring 242 (FIG. 20A, 20B) mounted concentrically between the left drive shaft 202 and a cylindrical flange 218 (FIG. 18B) of the left torque-sensing sheave 210 extending outwards from the surface 212 of the torque-sensing sheave 210 towards the left helix 230. The right helix 230 and the right helix holder 240 are similarly configured.

The separation between the left steering sheave, 220 and the torque-sensing sheave 210, is determined by the belt 300 held between them. The belt 300 spans the left driven pulley 200 and the left driver pulley 100. Since the length of the belt 300 and the distance between the driver pulley 100 and the driven pulley 200 is fixed, the belt 300 moves radially outwards on the driver pulley 100, and radially inwards on the driven pulley 200 as the rotation speed of the engine 8 increases and the ddCVT 10 changes from a disengaged to engaged, underdrive and overdrive configurations.

The separation between the left steering sheave 220L and the left torque-sensing sheave 210L of the left driven pulley 200 is increased by the left belt 300 pulling on their opposing cones to push the steering sheaves 220 and the torque-sensing sheaves 210 away from each other. When the left torque-sensing sheave 210 is pushed away from the left steering sheave 220, the left driven spring 242 is compressed. The compression of the left driven spring 242, and therefore, the inward force exerted by the left driven spring 242 on the torque-sensing sheave 210 (towards the steering sheave 220) increases with the separation between the torque-sensing sheave 210 and the steering sheave 220, or as the effective diameter of the belt 300 on the driven pulley 200 decreases. An additional inward force from the helix 230 to the torque sensing sheave 210, is created through the engagement of the projections 216 of the torque-sensing sheave 210 with the ramped sections 234 of the helix 230, which creates a transmission of the force through the torque-sensing sheave 210 to the helix 230. This force is proportional to the magnitude of the torque transmitted from the torque-sensing sheave 210 to the helix 230. The equilibrium position of the torque-sensing sheave 210, which determines the effective diameter of the driven pulley 200, is at an axial position of the torque-sensing sheave 210 where the inwardly directed forces of the left driven spring 242 and the helix 230 on the torque-sensing sheave 210 are balanced by the outwardly directed force of the belt 300 on the torque-sensing sheave 210.

When a load is applied to the drive shaft 202 (for example, while going uphill or braking) the helix 230, engaging the projections 216 of the torque-sensing sheave 210, exerts a larger inwardly directed force applied on the left torque-sensing sheave 210, pushing the torque-sensing sheave 210 inwards towards the corresponding left steering sheave 220, and thereby pushing the belt 300 radially outwards between the torque-sensing and steering sheaves, 210 and 220, respectively, to increase the diameter of the left driven pulley 200 and increase the torque delivered by the engine to the drive sprocket wheel 40 connected to the drive shaft 202.

As the ddCVT 10 changes from a disengaged to engaged, underdrive and overdrive configurations, the belts 300 move radially outwards on the driver pulleys 100, and radially inwards on the driven pulleys 200. The belts 300 therefore also move axially outwards towards the ends of the main shaft 102, and axially outwards towards the outer ends of the left and right drive shafts 202, 202, thereby always remaining aligned with respect to both the driver pulley 100 and driven pulley 200 on each side.

Figure 20A:
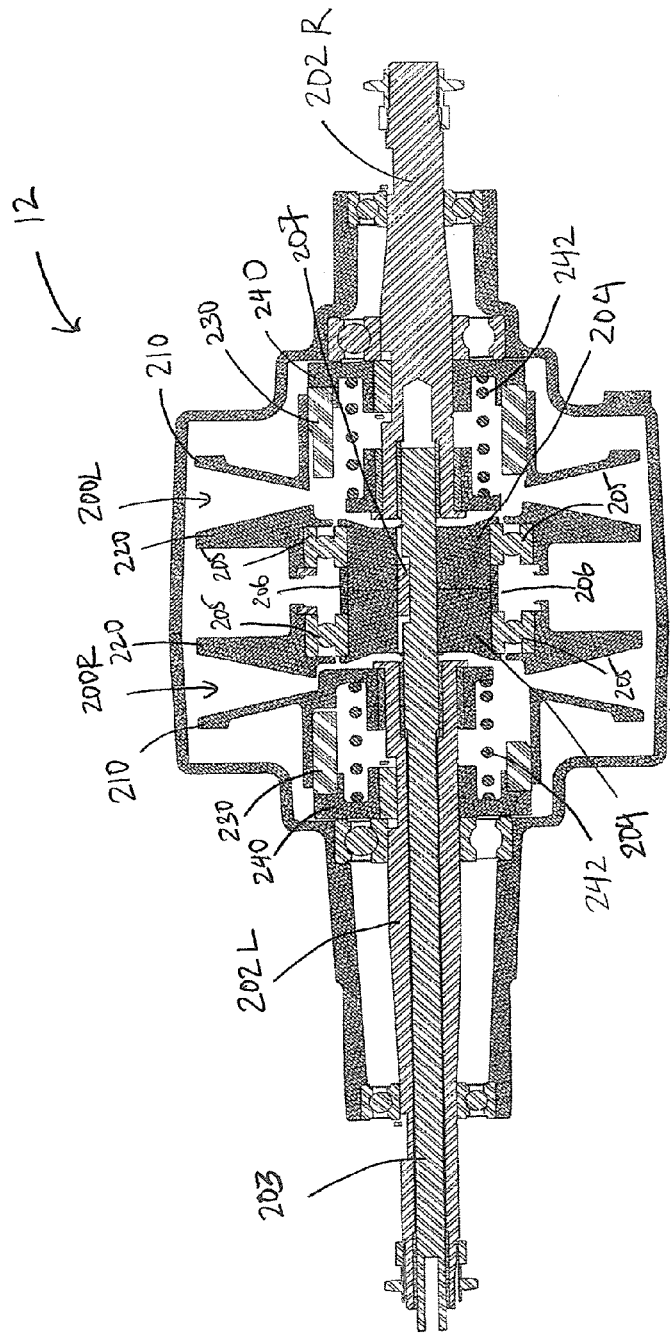
FIG. 20A is a cross-section taken along the line A-A of the driven pulley assembly of FIG. 17, showing the driven pulley assembly in a disengaged or underdrive configuration with the belt removed for clarity.
Figure 20B:
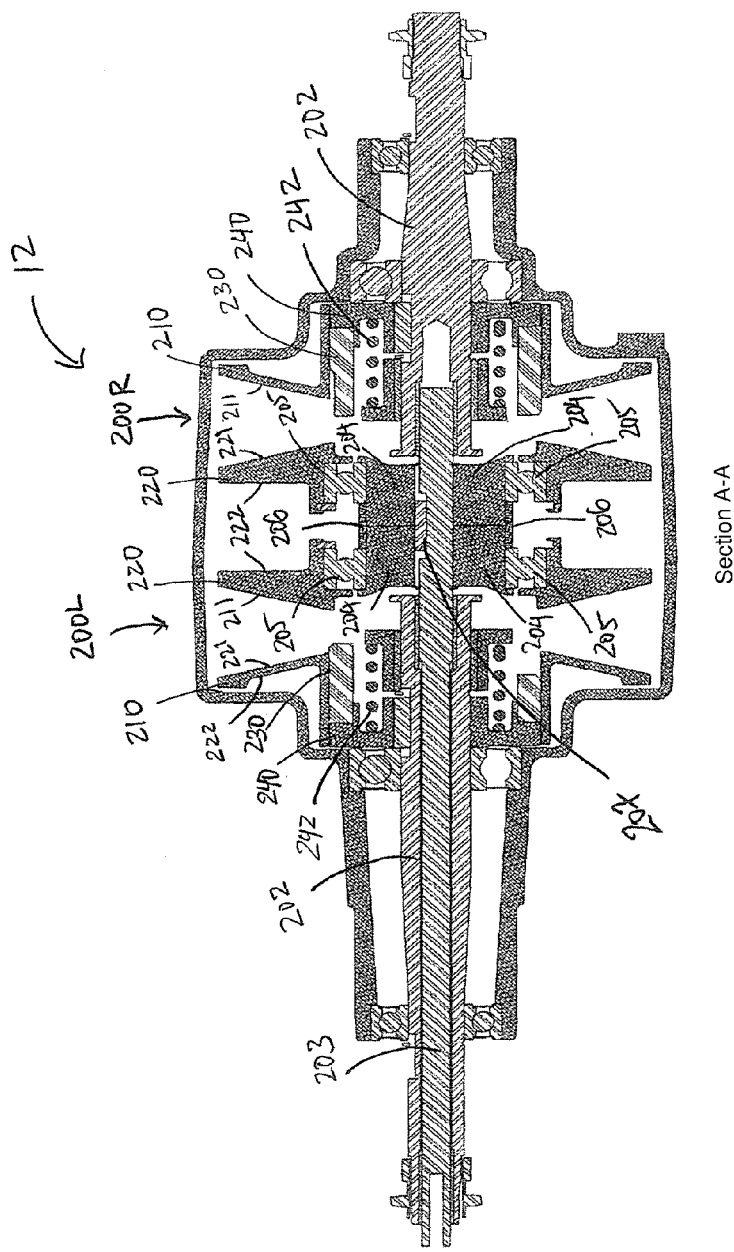
FIG. 20B is a cross-section taken along the line A-A of the driven pulley assembly of FIG. 17, showing the driven pulley assembly in an overdrive configuration with the belt removed for clarity.

With reference to FIGS. 20A and 20B, a steering rod 203, connected to the steering system 16 of the vehicle 1, is inserted from the right end of the right drive shaft 202, through the right drive shaft 202 into the left drive shaft 202. The steering rod 203 extends coaxially inside the right and left drive shafts, 202 and 202, but is uncoupled from them. The steering rod 203 does not rotate, but can be displaced leftward or rightward (in the axial direction) inside the drive shafts 202, for steering the vehicle 1. A pair of coaxial bearing hubs 204, 204 surround the steering rod 203 between the spaced drive shafts, 202 and 202. The rotatable steering sheaves 220, 220 are mounted on the stationary bearing hubs 204, 204 by a pair of roller bearings 205, 205. A bearing spacer 206, mounted concentrically on the pair of bearing hubs 204, 204 between the pair of roller bearings 205, 205 maintains a fixed separation between the roller bearings 205, 205 and thereby between the steering sheaves 220, 220.

The steering rod 203 is coupled to the steering sheaves 220 by retaining rings 207 to move the steering sheaves 220, leftward or rightward (in the axial direction) for steering the vehicle 1. When the steering sheaves 220 are moved leftward, the effective diameter of the left driven pulley 200 increases relative to the effective diameter of the right driven pulley 200, thereby driving the attached right chain 44R (FIGS. 21, 22), the right drive sprocket wheel 40R and the right track 5 relatively faster (than the left chain 44L, left drive sprocket wheel 40L and left track 4), and turning the vehicle 1 leftward. In the steering system 16 of the illustrated embodiment, the leftward or rightward displacement of the steering rod 203 is effected by pivoting the platform 2. In other embodiments, the steering rod 203 is actuated by electric means, by hydraulic means or any other mechanism in the art that can be fitted to actuate the steering rod 203.

Figure 21:
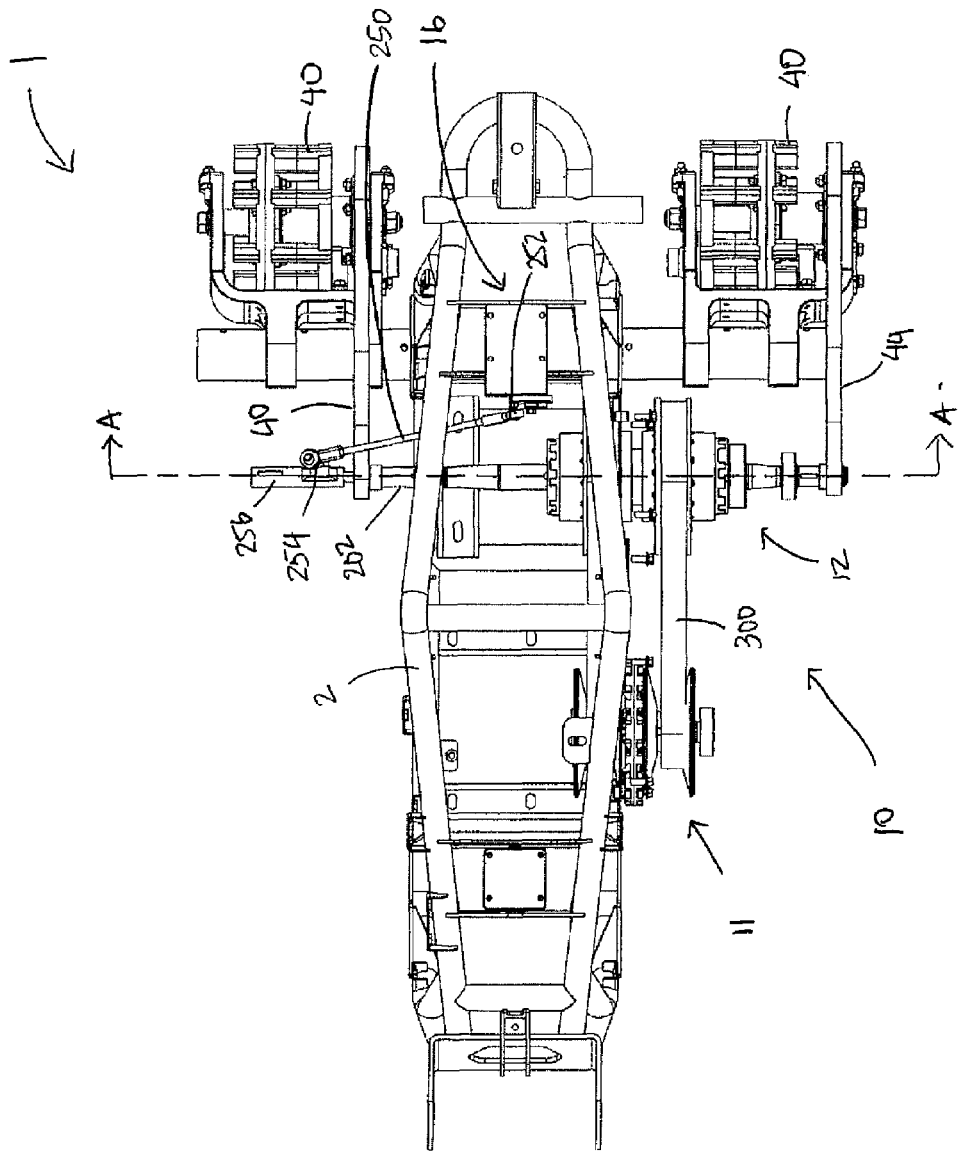
FIG. 21 is a top plan view of a portion of a vehicle according to another embodiment, with the platform removed for clarity and showing the steering system connected to the CVT.
Figure 22:
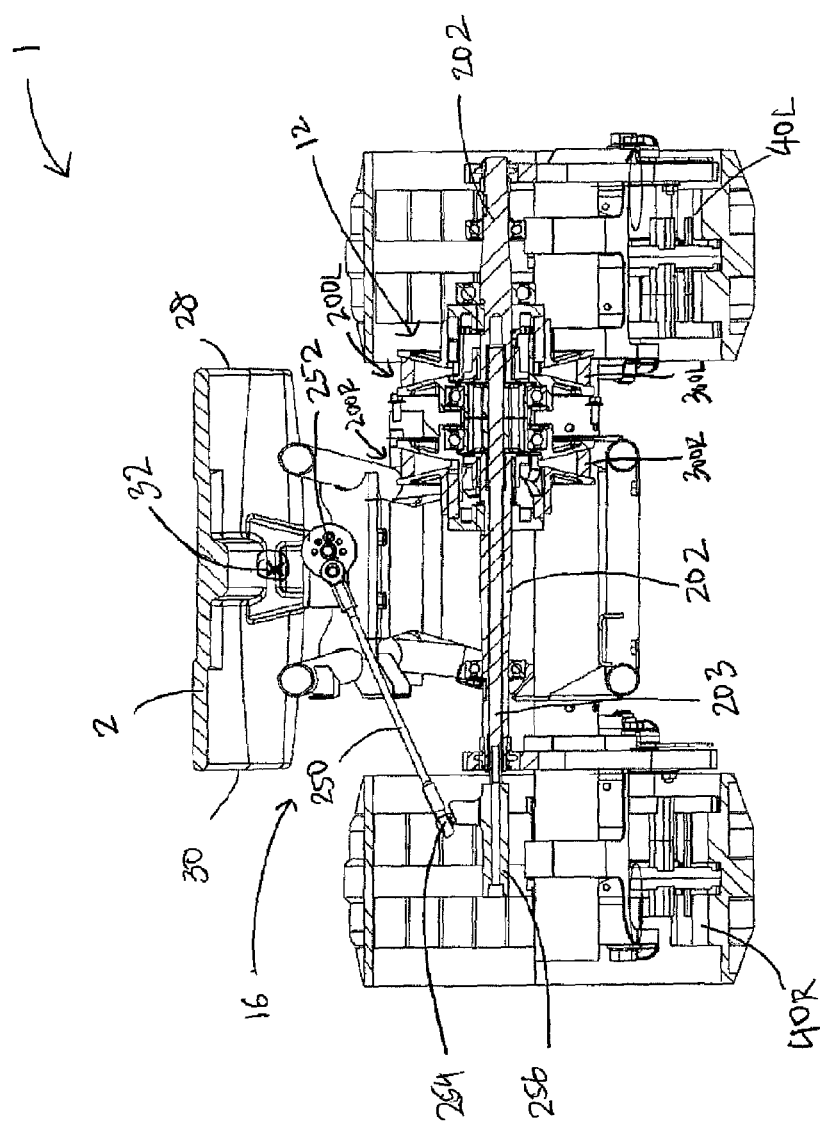
FIG. 22 is a cross-section, taken along the line A-A, of the portion of the vehicle of FIG. 21.

As explained above, the platform 2 can pivot about a pivot axis 32 so that the right side 30 is lower than the left side 28 or the left side 28 is lower than the right side 30 of the platform 2. With reference to FIGS. 21 and 22, a steering lever or tie rod 250 is pivotably connected at one end 252 to the platform 2. The end 252 of the steering lever or tie rod 250 is aligned laterally with the pivot axis 32 and spaced below the pivot axis 32 so that when the platform 2 pivots about the pivot axis 32, the end 252 rotates about the pivot axis 32, explained in more detail below.

The steering lever or tie rod 250 is connected at the second end 254 to the right end of the steering rod 203 via a slider sleeve 256 so that when the right side 30 of the platform 2 is pushed down, the end 252 rotates counter-clockwise, the steering rod 203 is pushed rightwards out of the drive shaft 202, pushing the steering sheaves 220, 220 rightwards, thereby decreasing the effective diameter of the left driven pulley 200L (relative to the right driven pulley 200R). Decreasing the relative effective diameter of the left driven pulley 200L increases the rotation speed of the left drive chain 44L and the left drive sprocket wheel 40L (relative to right drive chain and the drive sprocket wheel, 44R and 40R, respectively), causing left track 4 to move faster (relative to the right track 5) and the vehicle 1 to turn rightward. Thus, when the right side 30 of the platform 2 is pushed down, the vehicle 1 is steered rightward, and similarly, the vehicle 1 is steered leftward by pushing down on the left side of platform 2.

The platform 2 is biased to be in a center position where the left and right sides, 28 and 30, are at the same vertical level, so that the steering sheaves 220, 220 are in a center position such that the effective diameters of the right and left driven pulleys 200, 200 are equal.

It is contemplated that the vehicle 1 could have a different steering system, for example, a tension cable could be connected between the platform 2 and the steering rod 203 for steering the vehicle 1 by pivoting the platform. The steering rod 203 for the vehicle 1, can be readily adapted to be controlled by other power means, for example, by a electronically powered engine or an hydraulically powered engine. In some other embodiments, the vehicle 1 is steered by means other than pivoting the platform 2. The configuration and interconnections of the inner and outer sheaves, 220 and 210, and the drive shafts 202, is not to be considered limiting.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A continuously variable transmission (CVT) system for a vehicle, comprising:
    a main shaft, adapted to be operatively connected to an engine and adapted to be rotated by the engine;
    a drive shaft parallel to the main shaft;
    a driver pulley comprising a moveable sheave and a fixed sheave having cones on opposing surfaces, each of said moveable sheave and said fixed sheave being coaxially mounted on the main shaft for rotation therewith;
    the moveable sheave being moveable in an axial direction of the main shaft;
    the fixed sheave being fixed in the axial direction of the main shaft;
    a driven pulley comprising a steering sheave and a torque-sensing sheave having cones on opposing surfaces, the steering sheave and torque-sensing sheave being coaxially mounted on the drive shaft for rotation therewith;
    an endless belt, supported between the opposing cones of the moveable sheave and the fixed sheave and the opposing cones of the steering sheave and the torque-sensing sheave, the endless belt being adapted to change the separation between the opposing cones of the steering sheave and the torque-sensing sheave when the separation between the opposing cones of the moveable sheave and the fixed sheave is changed;
    a roller weight guide mounted on the main shaft adjacent to the moveable sheave on a side opposite to the fixed sheave, the roller weight guide having an inner periphery and an outer periphery;
    a plurality of guide rails on the roller weight guide, each guide rail having an end near the inner periphery and another end near the outer periphery;
    a plurality of roller weights mounted on the plurality of guide rails;
    a plurality of ramp structures extending in the radial direction on a surface of the moveable sheave adjacent to the roller weight guide, each of the plurality of ramp structures abutting one of the plurality of roller weights;
    each roller weight of the plurality of roller weights being adapted to move along at least one of the plurality of guide rails in a radial direction of the roller weight guide;
    each roller weight being adapted to move radially outwards with increasing rotational speed of the roller weight guide;
    each guide rail of the plurality of guide rails being disposed substantially parallel to one of the plurality of ramp structures;
    the moveable sheave moving towards the fixed sheave as the roller weights move radially outwards along abutting ramp structures.

2. The CVT system of claim 1, wherein each ramp structure has a first ramp profile in a radial direction of the moveable sheave.

3. The CVT system of claim 2, wherein the ramp profiles of the plurality of ramp structures are identical.

4. The CVT system of claim 2, wherein adjacent ramp structures have different ramp profiles.

5. The CVT system of claim 2, wherein the ramp profiles of the plurality of ramp structures alternate between the first ramp profile and a second ramp profile.

6. The CVT system of claim 1, wherein:
    the driver pulley is a left driver pulley;
    the moveable sheave is a left moveable sheave;
    the fixed sheave is a left fixed sheave;
    the drive shaft is a left drive shaft;
    the driven pulley is a left driven pulley;
    the steering sheave is a left steering sheave;
    the torque-sensing sheave is a left torque-sensing sheave;
    each of the plurality of roller weights is a left roller weight; and
    the endless belt is a left endless belt;
    and further comprising:
        a right drive shaft coaxial with the left drive shaft;
        a right driven pulley comprising a right steering sheave and a right torque-sensing sheave coaxially mounted on the right drive shaft to rotate therewith, opposing surfaces of the right steering sheave and the right torque-sensing sheave comprising opposing cones;
        a right driver pulley comprising a right moveable sheave and a right fixed sheave coaxially mounted on the main shaft to rotate therewith, opposing surfaces of the right moveable sheave and the right fixed sheave comprising opposing cones, the right moveable sheave being adjacent to the roller weight guide;
        a plurality of ramp structures extending in the radial direction on a surface of the right moveable sheave adjacent to the roller weight guide; and
        a right endless belt, supported between the opposing cones of the right moveable sheave and the right fixed sheave and the opposing cones of the right steering sheave and the right torque-sensing sheave, the right endless belt being adapted to change the separation between the opposing cones of the right steering sheave and the right torque-sensing sheave when the separation between the opposing cones of the right moveable sheave and the right fixed sheave is changed;
    wherein
    the right and left moveable sheaves are moveable in the axial direction;
    the right and left fixed sheaves are fixed in the axial direction;
    the right and left torque-sensing sheaves are moveable in the axial direction;
    a plurality of right roller weights mounted on the plurality of guide rails each of the plurality of ramp structures abutting one of the plurality of roller weights each of the left and right roller weights being adapted to move radially outwards with increasing rotational speed of the roller weight guide; and the right moveable sheave moving towards the right fixed sheave as the right roller weights move radially outwards along abutting ramp structures.

7. The CVT system of claim 6, wherein each ramp structure of the right moveable sheave coincides with one of the plurality of ramp structures of the left moveable sheave.

8. The CVT system of claim 6 wherein
the roller weight guide comprises a plurality of ramp windows, each ramp window coinciding with one of the plurality of ramp structures of the left moveable sheave, one of the plurality of ramp structures of right moveable sheave, and one of the plurality of roller weight pairs.

9. The CVT system of claim 8, wherein one of the left and right moveable sheaves is a male sheave and the other of the left and right moveable sheaves is a female sheave, the ramp structures of the male and female moveable sheaves being complementary.

10. The CVT system of claim 9, wherein:
each ramp structure of the female sheave comprises a radially extending gap; and
the male and female sheaves and the roller weight guide are mated together such that each ramp structure of the male sheave is received in the radially extending gap of the corresponding ramp structure of the female sheave within a corresponding ramp window of the roller weight guide.

11. The CVT system of claim 8, further comprising a plurality of roller weight sliders, wherein:
each roller weight slider is slidably mounted on a corresponding guide rail of the plurality of guide rails; and
each roller weight pair of left and right roller weights is rotatably mounted in two opposing roller weight sliders.

12. The CVT system of claim 11, wherein each of the plurality of roller weight sliders has defined therein a pair of left and right holes; and
the left roller weight of the corresponding roller weight pair is rotatably received in the left hole; and
the right roller weight of the corresponding roller weight pair is rotatably received in the right hole.

13. The CVT system of claim 11, wherein the left and right roller weights abut each other.

14. The CVT of claim 6, wherein the left and right steering sheaves are moveable in the axial direction along the respective left and right drive shafts.

15. The CVT system of claim 14, further comprising a left and right spring holder, wherein
each spring holder is closed at one end and open at an opposite end;
the left and right spring holders are disposed inside the main shaft coaxial with the main shaft and adjacent to one another at the open ends;
a driver pulley spring is disposed in the adjacent left and right spring holders;
the left and right spring holders being coupled respectively to the right and left moveable sheaves such that the left and right spring holders move towards each other compressing the driver pulley spring when the left and right moveable sheaves move away from each other.

16. The CVT system of claim 15, wherein the left spring holder and the right moveable sheave are coupled with at least two keys.

17. The CVT system of claim 15, wherein the right spring holder and the left moveable sheave are coupled with at least two keys.

18. The CVT of claim 16, wherein at least one of the at least two keys rotatably fixes the left moveable sheave to the main shaft.

19. The CVT of claim 16, wherein at least one of the at least two keys rotatably fixes the right moveable sheave to the main shaft.

20. The CVT system of claim 6, further comprising a steering member rigidly connected to the steering sheaves of the left and right driven pulleys, the steering member being selectively moveable between:
a left position where the left driven pulley diameter is larger than the right driven pulley diameter;
a right position where the right driven pulley diameter is larger than the left driven pulley diameter; and
a center position where the diameters of the left and right driven pulleys are equal.

21. The CVT system of claim 20, wherein the steering member is a steering rod disposed inside the left drive shaft, right drive shaft or both the left drive shaft and the right drive shaft.

22. A vehicle comprising:
a motor having an output shaft;
one of at least two wheels and a pair of tracks; and
a CVT system according to claim 6;
wherein
the output shaft is connected to the main shaft;
a left one of one of the at least two wheels and the pair of tracks is connected to the left drive shaft; and
a right one of one of the at least two wheels and the pair of tracks is connected to the right drive shaft.

23. The vehicle according to claim 22, further comprising a steering system coupling the left and right driven pulleys.

24. The vehicle according to claim 22, wherein the one of the at least two wheels and the pair of tracks is a pair of tracks.

25. A driver pulley assembly for a continuously variable transmission (CVT), comprising:
a roller weight guide adapted to be mounted on a main shaft of the CVT, the roller weight guide having an inner periphery and an outer periphery;
a plurality of ramp windows extending radially along the roller weight guide;
each ramp window including:
a pair of guide rails extending along opposite edges of the ramp window;
a roller weight mounted on the pair of guide rails, the roller weight being adapted to move along the pair of guide rails in a radial direction of the roller weight guide; and
a ramp structure coinciding with the ramp window, the ramp structure extending in the radial direction of the roller weight guide and abutting the roller weight;
the roller weight being adapted to move radially outwards along the ramp structure with increasing rotational speed of the roller weight guide.

26. The driver pulley assembly of claim 25, wherein
the roller weight of each ramp window is a left roller weight;
the ramp structure coinciding with each ramp window is a left ramp structure abutting the left roller weight;
each ramp window further including:
a right roller weight mounted adjacent to the left roller weight on the pair of guide rails, each left and right roller weight forming a roller weight pair, the roller weight pair being adapted to move along the pair of guide rails in a radial direction of the roller weight guide; and a right ramp structure coinciding with each ramp window, the ramp structure extending in the radial direction of the roller weight guide and abutting the right roller weight;

the right roller weight being adapted to move radially outwards along the right ramp structure with increasing rotational speed of the roller weight guide.

27. The CVT system of claim 6, wherein a right roller weight mounted on the roller weight guide is adjacent to each left roller weight of the plurality of roller weights to form a plurality of roller weight pairs.

* * * * *